United States Patent
Lee et al.

(10) Patent No.: US 11,411,676 B2
(45) Date of Patent: Aug. 9, 2022

(54) METHOD AND APPARATUS FOR TRANSMITTING AND RECEIVING MULTICAST UNICAST OVERLAPPED TRANSMISSION SIGNAL IN WIRELESS COMMUNICATION SYSTEM

(71) Applicant: Samsung Electronics Co., Ltd., Gyeonggi-do (KR)

(72) Inventors: Byungju Lee, Gyeonggi-do (KR);
Younsun Kim, Gyeonggi-do (KR);
Hyojin Lee, Gyeonggi-do (KR);
Junghyun Kim, Gyeonggi-do (KR);
Juho Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/057,923

(22) PCT Filed: May 21, 2019

(86) PCT No.: PCT/KR2019/006087
§ 371 (c)(1),
(2) Date: Nov. 23, 2020

(87) PCT Pub. No.: WO2019/225952
PCT Pub. Date: Nov. 28, 2019

(65) Prior Publication Data
US 2021/0211228 A1 Jul. 8, 2021

(30) Foreign Application Priority Data
May 21, 2018 (KR) .......... 10-2018-0057896

(51) Int. Cl.
*H04L 1/00* (2006.01)
*H04L 5/00* (2006.01)

(52) U.S. Cl.
CPC .......... *H04L 1/0047* (2013.01); *H04L 1/0068* (2013.01); *H04L 5/0051* (2013.01)

(58) Field of Classification Search
CPC ... H04L 1/0047; H04L 1/0068; H04L 5/0051; H04W 24/10; H04W 72/0042; H04W 72/044; H04W 4/06
See application file for complete search history.

(56) References Cited

U.S. PATENT DOCUMENTS

| | | | | |
|---|---|---|---|---|
| 2015/0009925 A1* | 1/2015 | Park | ............... | H04L 27/2602 370/329 |
| 2016/0013897 A1* | 1/2016 | Sun | ............... | H04L 5/005 370/312 |

(Continued)

FOREIGN PATENT DOCUMENTS

| KR | 10-2018-0008567 | 1/2018 |
|---|---|---|
| KR | 10-2018-0013660 | 2/2018 |

(Continued)

OTHER PUBLICATIONS

PCT/ISA/210 Search Report issued on PCT/KR2019/006087, dated Aug. 23, 2019 (5 pp).

(Continued)

*Primary Examiner* — Redentor Pasia
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety (Continued)

services. A method of controlling a terminal according to one embodiment of the present invention may comprise the steps of receiving, from a base station, set information including information on a location of at least one resource to which a demodulation reference signal (DMRS) of a unicast signal is to be mapped; receiving a multicast signal and the unicast signal from the base station; decoding the multicast signal on the basis of the set information; and decoding the unicast signal on the basis of the decoded multicast signal.

16 Claims, 16 Drawing Sheets

(56) References Cited

U.S. PATENT DOCUMENTS

| | | | |
|---|---|---|---|
| 2016/0119096 A1* | 4/2016 | Sun | H04W 72/042 370/329 |
| 2016/0337841 A1 | 11/2016 | Won et al. | |
| 2016/0344575 A1* | 11/2016 | Gong | H04W 72/042 |
| 2017/0064519 A1* | 3/2017 | Li | H04W 4/06 |
| 2018/0049168 A1 | 2/2018 | Ryu et al. | |
| 2018/0054339 A1* | 2/2018 | Sun | H04L 27/22 |
| 2018/0069651 A1* | 3/2018 | Davydov | H04L 5/0037 |
| 2018/0091959 A1* | 3/2018 | Sun | H04W 88/04 |
| 2019/0158259 A1 | 5/2019 | Park et al. | |
| 2019/0165894 A1 | 5/2019 | Choi et al. | |
| 2019/0215870 A1* | 7/2019 | Babaei | H04L 5/001 |
| 2019/0349915 A1* | 11/2019 | Ahn | H04L 5/0091 |
| 2020/0196161 A1* | 6/2020 | Ahn | H04B 7/06 |

FOREIGN PATENT DOCUMENTS

| | | |
|---|---|---|
| KR | 10-2018-0018350 | 2/2018 |
| WO | WO 2017/095471 | 6/2017 |
| WO | WO 2017/217748 | 12/2017 |

OTHER PUBLICATIONS

PCT/ISA/237 Written Opinion issued on PCT/KR2019/006087, dated Aug. 23, 2019 (7 pp).

Qualcomm Incorporated, 'Discussion on DL DMRS design', R1-1713407, 3 GPP TSG RAN WG1 Meeting #90, Prague, Czech Republic, Aug. 12, 2017 (14 pp).

LG Electronics, 'On DMRS design', R1-1719912, 3GPP TSG RAN WG1 Meeting #91, Reno, USA, Nov. 18, 2017 (9 pp).

* cited by examiner

METHOD AND APPARATUS FOR TRANSMITTING AND RECEIVING MULTICAST UNICAST OVERLAPPED TRANSMISSION SIGNAL IN WIRELESS COMMUNICATION SYSTEM

PRIORITY

This application is a National Phase Entry of PCT International Application No. PCT/KR2019/006087 which was filed on May 21, 2019, and claims priority to Korean Patent Application No. 10-2018-0057896, which was filed on May 21, 2018, the content of each of which is incorporated herein by reference.

TECHNICAL FIELD

The disclosure relates to a method and an apparatus for transmitting and receiving a multicast unicast overlapping signal in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, a need for a method of transmitting and receiving a multicast signal and a unicast signal in a 5G communication system has arisen.

DISCLOSURE OF INVENTION

Technical Problem

An aspect of the disclosure is to efficiently transmit and receive a multicast signal and a unicast signal through overlapping resources in a 5G wireless communication system according to the need.

Solution to Problem

A method of a terminal in a wireless communication system according to an embodiment of the disclosure may include a step of receiving information on unicast demodulation reference signal (DMRS) mapping resources, a step of decoding a multicast signal in a received signal on the basis of the received information, and a step of decoding a unicast signal on the basis of the received signal and the decoded multicast signal.

The step of receiving the information may further include a step of receiving set information including candidate resources of the unicast DMRS mapping resources through higher-layer signaling.

When resources which are being currently used for transmission of the unicast DMRS among candidate resources of the unicast DMRS mapping resources included in the set information can be identified, the step of decoding the multicast signal may include decoding the multicast signal on the basis of the assumption of a specific value for the locations of the unicast DMRS mapping resources.

When resources which are being currently used for transmission of the unicast DMRS among candidate resources of the unicast DMRS mapping resources included in the set information cannot be identified, the step of decoding the multicast signal may include decoding the multicast signal except for the candidate resources of the unicast DMRS mapping resources.

The step of decoding the unicast signal may include decoding the unicast signal by cancelling the decoded multicast signal from the received signal. A terminal according to an embodiment of the disclosure may include a transceiver configured to transmit and receive a signal; and a processor configured to control the transceiver to receive information on unicast demodulation reference signal (DMRS) mapping resources, decode a multicast signal in a received signal on the basis of the received information, and decode a unicast signal on the basis of the received signal and the decoded multicast signal.

The processor may control the transceiver to receive set information including candidate resources of the unicast DMRS mapping resources through higher-layer signaling.

When resources which are being currently used for transmission of the unicast DMRS among candidate resources of the unicast DMRS mapping resources included in the set information can be identified, the processor may perform control to decode the multicast signal on the basis of the assumption of a specific value for the locations of the unicast DMRS mapping resources.

When resources which are being currently used for transmission of the unicast DMRS among candidate resources of the unicast DMRS mapping resources included in the set information cannot be identified, the processor may perform control to decode the multicast signal except for candidate resources of the unicast DMRS mapping resources.

The processor may perform control to decode the unicast signal by cancelling the decoded multicast signal from the received signal. A method of a base station in a wireless communication system according to an embodiment of the disclosure may include, when a multicast signal and a unicast signal are overlappingly scheduled, a step of transmitting information on demodulation reference signal (DMRS) mapping resources to a terminal, a step of mapping a multicast signal to resources in consideration of the unicast DMRS mapping resources, and a step of transmitting the multicast signal.

The step of transmitting the information may further include a step of transmitting set information including candidate resources of the unicast DMRS mapping resources through higher-layer signaling.

The method may further include a step of identifying whether the numbers of unicast DMRS ports of a plurality of terminals receiving the multicast signals are the same, wherein the step of mapping the multicast signal may further include a step of performing puncturing in the unicast DMRS mapping resources when the numbers of unicast DMRS ports of the plurality of terminals are not the same on the basis of the identification result.

The method may further include a step of identifying whether the numbers of unicast DMRS ports of a plurality of terminals receiving the multicast signals are the same, wherein the step of mapping the multicast signal may include, when the numbers of unicast DMRS ports of the plurality of terminals are not the same on the basis of the identification result, puncturing is performed in the unicast DMRS mapping resources and mapping the multicast signal to the remaining resources except for locations of the multicast DMRS mapping resources through rate matching.

The method may further include: a step of mapping the unicast signal to resources except for the unicast DMRS mapping resources and the multicast DMRS mapping resources, and a step of transmitting the unicast signal through resources that overlap resources through which the multicast signal is transmitted.

A base station according to an embodiment of the disclosure may include a transceiver configured to transmit and receive a signal, and a processor configured to, when a multicast signal and a unicast signal are overlappingly scheduled, control the transceiver to transmit information on demodulation reference signal (DMRS) mapping resources to a terminal, map a multicast signal to resources in consideration of the unicast DMRS mapping resources, and control the transceiver to transmit the multicast signal.

The processor may control the transceiver to transmit set information indicating candidate resources of the unicast DMRS mapping resource through higher-layer signaling.

The processor may identify whether the numbers of unicast DMRS ports of a plurality of terminals receiving the multicast signal are the same and, when the numbers of unicast DMRS ports of the plurality of terminals are not the same on the basis of the identification result, perform puncturing in the unicast DMRS mapping resources.

The processor may identify whether the numbers of unicast DMRS ports of a plurality of terminals receiving the multicast signals are the same and, when the numbers of unicast DMRS ports of the plurality of terminals are not the same on the basis of the identification result, map the multicast signal to the remaining resources other than locations of the multicast DMRS mapping resources through rate matching.

The processor may map the unicast signal to resources except for the unicast DMRS mapping resources and the multicast DMRS mapping resources and control the transceiver to transmit the unicast signal through resources that overlap resources through which the multicast signal is transmitted.

In accordance with an aspect of the disclosure, a method of controlling a terminal in a wireless communication is provided. The method includes: receiving set information including information on a location of at least one resource to which a demodulation reference signal (DMRS) of a unicast signal can be mapped from a base station; receiving a multicast signal and the unicast signal from the base station; decoding the multicast signal, based on the set information; and decoding the unicast signal, based on the decoded multicast signal.

The method may include decoding the multicast signal on the basis of the assumption of a specific value of the locations of the at least one resource identified on the basis of the set information, cancelling the decoded multicast signal from the signal received from the base station, and decoding the unicast signal.

The method may further include: receiving reference signal information related to the unicast signal from the base station; receiving power information related to interference of the multicast signal on the unicast signal from the base station; acquiring channel state information related to the unicast signal, based on the reference signal information and the power information; and transmitting the channel state information to the base station.

The power information may include information on a ratio of energy per resource element (EPRE) of a physical downlink data channel (physical downlink shared channel (PDSCH)) of the unicast signal to a PDSCH EPRE of the multicast signal.

In accordance with another aspect of the disclosure, a terminal in a wireless communication system is provided. The terminal includes: a transceiver configured to transmit and receive a signal; and at least one processor connected to the transceiver, wherein the at least one processor is configured to control the transceiver to receive set information including information on locations of at least one resource to which a demodulation reference signal (DMRS) of a unicast signal can be mapped from a base station and receive a multicast signal and the unicast signal from the base station, and perform control to decode the multicast signal, based on the set information and decode the unicast signal, based on the decoded multicast signal.

The processor may be configured to perform control to decode the multicast signal, based on assumption of a specific value of the locations of the at least one resource identified based on the set information, cancel the decoded multicast signal from the signal received from the base station, and decode the unicast signal.

The processor may be configured to control the transceiver to receive reference signal information related to the unicast signal from the base station and receive power information related to interference of the multicast signal on the unicast signal from the base station, perform control to acquire channel state information related to the unicast signal, based on the reference signal information and the power information, and control the transceiver to transmit the channel state information to the base station.

The power information may include information on a ratio of energy per resource element (EPRE) of a physical downlink data channel (physical downlink shared channel (PDSCH)) of the unicast signal to a PDSCH EPRE of the multicast signal.

In accordance with another aspect of the disclosure, a method of controlling a base station in a wireless communication system is provided. The method includes: when a multicast signal and a unicast signal are overlappingly scheduled, transmitting set information including information on locations of at least one resource to which a demodulation reference signal (DMRS) of the unicast signal can be mapped to a terminal; mapping the multicast signal and the unicast signal to resources, based on the set information; and transmitting the mapped multicast signal and unicast signal.

In the method, the multicast signal may be mapped through a puncturing method, based on the set information, and the unicast signal may be mapped through a rate matching method, based on the set information and information related to resources to which a DMRS of the multicast signal can be mapped.

The method may further include: transmitting reference signal information related to the unicast signal to the terminal; transmitting power information related to interference of the multicast signal on the unicast signal to the terminal; and receiving channel state information related to the unicast signal from the terminal, wherein the channel state information is acquired from the terminal, based on the power information.

The power information may include information on a ratio of energy per resource element (EPRE) of a physical downlink data channel (physical downlink shared channel (PDSCH)) of the unicast signal to a PDSCH EPRE of the multicast signal.

In accordance with another aspect of the disclosure, a base station in a wireless communication system is provided. The base station includes: a transceiver configured to transmit and receive a signal; and at least one processor connected to the transceiver, wherein the at least one processor is configured to control the transceiver to, when a multicast signal and a unicast signal are overlappingly scheduled, transmit set information including information on locations of at least one resource to which a demodulation reference signal (DMRS) of the unicast signal can be mapped to a terminal, perform control to map the multicast signal and the unicast signal to resources, based on the set information, and control the transceiver to transmit the mapped multicast signal and unicast signal to the terminal.

In the base station, the multicast signal may be mapped through a puncturing method, based on the set information, and the unicast signal may be mapped through a rate matching method, based on the set information and information related to resources to which a DMRS of the multicast signal can be mapped.

The processor may be configured to control the transceiver to transmit reference signal information related to the unicast signal to the terminal and transmit power information related to interference of the multicast signal on the unicast signal to the terminal, and receive channel state information related to the unicast signal from the terminal, and the channel state information is acquired from the terminal, based on the power information.

The power information may include information on a ratio of energy per resource element (EPRE) of a physical downlink data channel (physical downlink shared channel (PDSCH)) of the unicast signal to a PDSCH EPRE of the multicast signal.

Advantageous Effects of Invention

According to an embodiment of the disclosure, it is possible to efficiently transmit and receive a multicast signal and a unicast signal through overlapping resources in a 5G wireless communication system.

MODE FOR THE INVENTION

Figure 1:
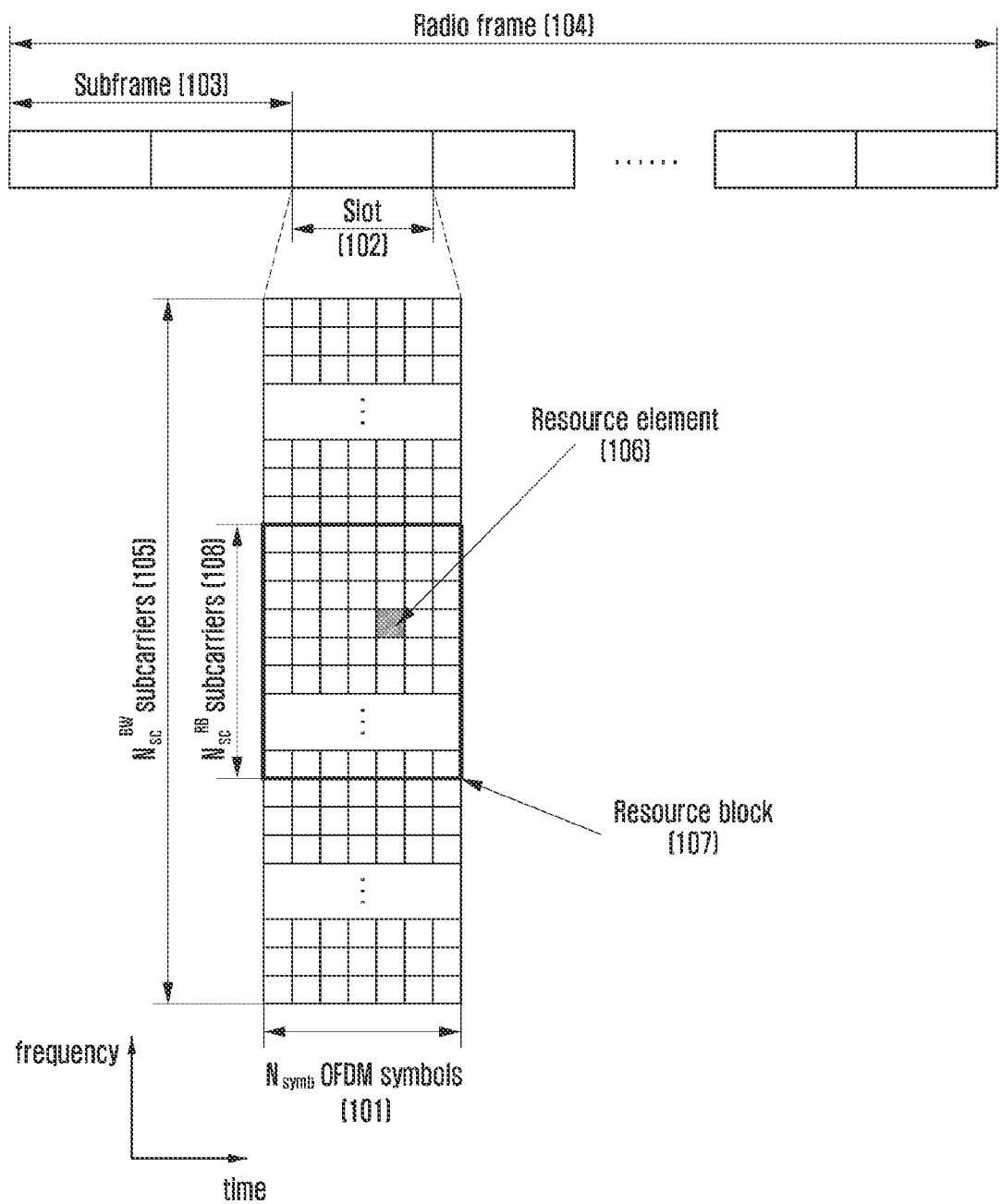
FIG. 1 illustrates the basic structure of time and frequency domains in LTE.

A wireless communication system has developed into a broadband wireless communication system that provides a high-speed and high-quality packet data service, like the communication standards, for example, high-speed packet access (HSPA) of 3GPP, long-term evolution (LTE) or evolved universal terrestrial radio access (E-UTRA), LTE-advanced (LTE-A), high rate packet data (HRPD) of 3GPP2, ultra-mobile broadband (UMB), and 802.16e of IEEE, or the like, beyond the voice-based service provided in initial stages.

An LTE system, which is a representative example of the broadband wireless communication system, employs an orthogonal frequency-division multiplexing (OFDM) scheme for a downlink (DL), and employs a single-carrier frequency-division multiple access (SC-FDMA) scheme for an uplink (UL). The uplink is a radio link through which the terminal (a user equipment (UE) or a mobile station (MS)) transmits data or a control signal to the eNB (an eNodeB or a base station (BS)), and the downlink is a radio link through which the base station transmits data or a control signal to the terminal. In such a multi-access scheme, time-frequency resources for carrying data or control information are allocated and operated in a manner to prevent overlapping of resources, that is, to establish orthogonality, between users so as to identify data or control information of each user.

A post-LTE communication system, that is, a 5G communication system (interchangeable with a 5G system), should be able to freely reflect the various requirements of a user and a service provider, and thus it is required to support a service which satisfies the various requirements. Services considered for implementation in the 5G communication system include enhanced mobile broadband (eMBB), massive machine-type communication (mMTC), and ultra-reliability low-latency communication (URLLC).

The eMBB aims to provide a data transmission rate which is improved so as to surpass the data transmission speed supported by the LTE, LTE-A, or LTE-Pro system. For example, in the 5G communication system, the eMBB should provide a peak downlink data rate of 20 Gbps and a peak uplink data rate of 10 Gbps from the viewpoint of a single base station. Further, the 5G communication system should provide not only the peak data rate but also an increased user-perceived data rate. In order to satisfy such requirements, improvement of various transmission/reception technologies, including a further improved multi-input multi-output (MIMO) transmission technology, is needed. Further, while the current LTE system uses transmission bandwidths from a bandwidth of 2 GHz to a maximum bandwidth of 20 MHz to transmit signals, the 5G communication system uses a frequency bandwidth wider than 20 MHz to transmit signals in frequency bands of 3 to 6 GHz or greater than 6 GHz, whereby the data transmission rate required by the 5G communication system can be satisfied.

Also, in order to support an application service such as the Internet of Things (IoT), mMTC is considered for implementation in the 5G communication system. The mMTC is required to support access by massive numbers of UEs within a cell, improve coverage of the UE, increase a battery lifetime, and reduce the costs of the UE in order to efficiently provide IoT. IoT connects various sensors and devices to provide a communication function, and thus should support a large number of terminals (for example, 1,000,000 terminals/km$^2$) within a cell. Further, since the terminal supporting the mMTC is highly likely to be located in a shade area, such as a basement, which a cell cannot cover due to service characteristics, the mMTC requires wider coverage than other services provided by the 5G communication system. The terminal supporting the mMTC needs to be produced at low cost and it is difficult to frequently exchange a battery thereof, and thus a very long battery lifetime, for example, 10 to 15 years, is required.

Last, the URLLC is a cellular-based wireless communication service used for a particular (mission-critical) purpose. For example, services used for remote control of robots or machinery, industrial automation, unmanned aerial vehicles, remote health care, and emergency alerts may be considered. Accordingly, communication provided by the URLLC should provide very low latency and very high reliability. For example, services supporting the URLLC should satisfy a radio access delay time (air interface latency) shorter than 0.5 milliseconds and also have requirements of a packet error rate equal to or smaller than $10^{-5}$. Accordingly, for services supporting the URLLC, the 5G system should provide a transmit time interval (TTI) smaller than that of other systems and also has design requirements of allocating wide resources in a frequency band in order to guarantee reliability of a communication link.

Three services of 5G, namely eMBB, URLLC, and mMTC, may be multiplexed and transmitted in one system. At this time, in order to meet the different requirements of the respective services, different transmission/reception schemes and transmission/reception parameters may be used for the services.

Hereinafter, the frame structure of the LTE and LTE-A systems will be described in more detail with reference to the drawings.

FIG. 1 illustrates a basic structure of time-frequency domains which are radio resource domains in which data or a control channel is transmitted in the LTE system.

In FIG. 1, the horizontal axis indicates the time domain, and the vertical axis indicates the frequency domain. In the time region, the minimum transmission unit is an OFDM symbol. One slot 102 consists of $N_{symb}$ OFDM symbols 101, and one subframe 103 consists of two slots. The length of one slot is 0.5 ms, and the length of one subframe is 1.0 ms. A radio frame 104 is a time region interval consisting of 10 subframes. The minimum transmission unit in the frequency region is a subcarrier, and the entire system transmission bandwidth consists of a total of $N_{BW}$ subcarriers 105. In the time-frequency regions, the basic resource unit is a resource element (RE) 106, which is expressed by an OFDM symbol index and a subcarrier index. A resource block (RB) 107 (or physical resource block (PRB)) is defined by $N_{symb}$ consecutive OFDM symbols 101 in the time region and $N_{RB}$ consecutive subcarriers 108 in the frequency region. Therefore, one RB 108 includes $N_{symb} \times N_{RB}$ REs 106. Generally, the minimum transmission unit of data is an RB. In the LTE system, generally, $N_{symb}=7$ and NRB=12. $N_{BW}$ and $N_{RB}$ are proportional to a system transmission bandwidth.

Next, downlink control information (DCI) in the LTE and LTE-A systems will be described in more detail.

In the LTE system, scheduling information of downlink data or uplink data is transmitted from the base station to the terminal through the DCI. The DCI may operate through the application of one of various predefined DCI formats depending on whether scheduling information is scheduling information of uplink data or downlink data, whether the DCI is compact DCI having small size control information, and whether spatial multiplexing using multiple antennas is applied, and the DCI is DCI for controlling power. For example, DCI format 1, which is downlink data scheduling information, may include the following control information.

Resource allocation type 0/1 flag: indicates whether a resource allocation type is type 0 or type 1. Type 0 applies a bitmap scheme and allocates resources in units of resource block groups (RBGs). In the LTE system, a basic scheduling unit is a resource block (RB) expressed by time and frequency domain resources, and an RBG includes a plurality of RBs and is used as a basic scheduling unit in the type 0 scheme. Type 1 allows allocation of a predetermined RB in an RBG.

Resource block assignment: indicates RBs allocated to data transmission. Expressed resources are determined according to the system bandwidth and resource allocation scheme.

Modulation and coding scheme (MCS): indicates a modulation scheme used for data transmission and the size of a transport block, which is data to be transmitted.

HARQ process number: indicates a process number of HARQ.

New data indicator: indicates HARQ initial transmission or HARQ retransmission.

Redundancy version: indicates a redundancy version of HARQ.

Transmit power control (TPC) command for physical uplink control channel (PUCCH): indicates a transmission power control command for a PUCCH which is an uplink control channel.

The DCI is transmitted through a PDCCH, which is a downlink physical control channel, via a channel-coding and modulation process.

A cyclic redundancy check (CRC) is added to a DCI message payload and is scrambled with a radio network temporary identifier (RNTI) corresponding to the identity of the terminal. Depending on the purpose of the DCI message, for example, terminal (UE)-specific data transmission, a power control command, or a random access response, different RNTIs are used. The RNTI is not explicitly transmitted, but is transmitted in the state of being included in a CRC calculation process. If the DCI message transmitted through the PDCCH is received, the UE may identify the CRC through the allocated RNTI, and may recognize that the corresponding message is transmitted to the UE when the CRC is determined to be correct on the basis of the CRC identification result.

Figure 2:
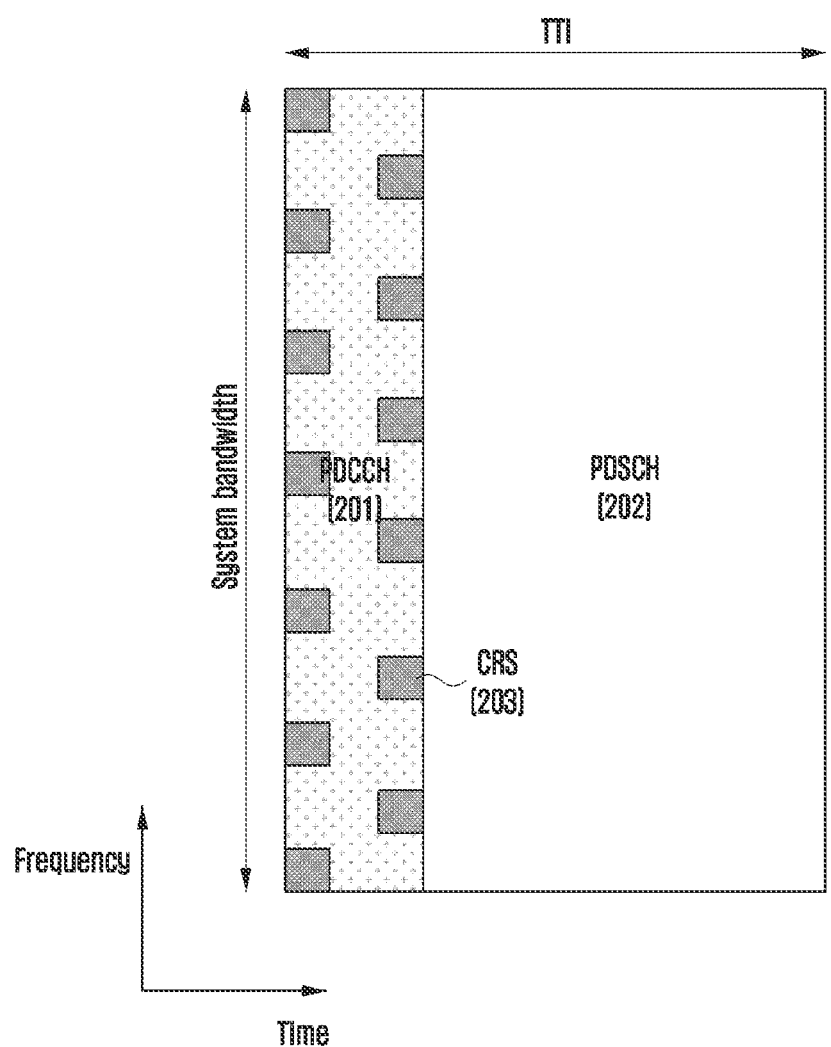
FIG. 2 illustrates a downlink control channel in LTE.

FIG. 2 illustrates a PDCCH 201, which is a downlink physical channel through which DCI in the LTE system is transmitted.

Referring to FIG. 2, the PDCCH 201 is multiplexed with a PDSCH 202, which is a data transmission channel, on the time axis and is transmitted over the entire system bandwidth. The region of the PDCCH 201 is expressed by the number of OFDM symbols, and is indicated to the terminal through a control format indicator (CFI) transmitted through a physical control format indicator channel (PCFICH). By allocating the PDCCH 201 to OFDM symbols on the front part of the subframe, the terminal may decode downlink scheduling allocation as soon as possible, and thus a decoding delay for a downlink shared channel (DL-SCH), that is, an entire downlink transmission delay, may be reduced. One PDCCH carries one DCI message, and a plurality of terminals may be simultaneously scheduled on the downlink and the uplink, so that a plurality of PDCCH transmissions is simultaneously performed within respective cells. A CRS 203 is used as a reference signal for decoding the PDCCH 201. The CRS 203 is transmitted in every subframe over the entire band, and scrambling and resource mapping vary depending on a cell identity (ID). Since the CRS 203 is a reference signal used in common by all UEs, UE-specific beamforming cannot be used. Accordingly, a multi-antenna transmission scheme of the PDCCH in LTE is limited to open-loop transmission diversity. The number of ports of the CRS is implicitly made known to the terminal from decoding of a physical broadcast channel (PBCH).

Resource allocation of the PDCCH 201 is based on a control-channel element (CCE), and one CCE consists of 9 resource element groups (REGs), that is, a total of 36 resource elements (REs). The number of CCEs required for a particular PDCCH 201 may be 1, 2, 4, or 8, which varies depending on the channel-coding rate of the DCI message payload. As described above, different numbers of CCEs may be used to implement link adaptation of the PDCCH 201. The UE is required to detect a signal without being aware of information on the PDCCH 201, so a search space indicating a set of CCEs is defined for blind decoding in LTE. The search space includes a plurality of sets at an aggregation level (AL) of each CCE, which is not explicitly signaled but is implicitly defined through a function using a UE identity and a subframe number. In each subframe, the UE performs decoding on the PDCCH 201 with respect to all resource candidates that can be configured by CCEs within the set search space and processes declared information valid for the corresponding terminal through identification of the CRC.

The search space is classified into a terminal-specific search space and a common search space. Terminals in a predetermined group or all UEs may search for a common search space of the PDCCH 2901 in order to receive cell-common control information such as dynamic scheduling of system information or paging messages. For example, scheduling allocation information of the DL-SCH for transmission of system information block (SIB)-1 including service provider information of the cell may be received by searching for the common search space of the PDCCH 201.

In LTE, the entire PDCCH region includes a set of CCEs in a logical area and there is a search space including the set of CCEs. The search space is classified into a common search space and a terminal-specific search space, and the search space for the LTE PDCCH is defined as [Table 1] below.

TABLE 1

The set of PDCCH candidates to monitor are defined in terms of search spaces, where a search space $S_k^{(L)}$ at aggregation level $L \in \{1, 2, 4, 8\}$ defined by a set of PDCCH candidates. For each serving cell on which PDCCH is monitored, the CCEs corresponding to PDCCH candidate m of the search space $S_k^{(L)}$ are given by $L \{(Y_k + m') \bmod \lfloor N_{CCE,k}/L \rfloor\} + i$ where $y_k$ is defined below, $i = 0, \ldots, L - 1$. For the common search space $m' = m$. For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then $m' = m$, where $m = 0, \ldots, M^{(L)} - 1$. $M^{(L)}$ is the number of PDCCH candidates to monitor in the given search space.

TABLE 1-continued

Note that the carrier indicator field value is the same as ServCellIndex
For the common search spaces, $Y_k$ is set to 0 for the two aggregation levels
L = 4 and L = 8.
For the UE-specific search space $S_k^{(L)}$ at aggregation level L, the variable $Y_k$
is defined by
$Y_k = (A \cdot Y_{k-1}) \mod D$
where $Y_{-1} = n_{RNTI} \neq 0$, A = 39827, D = 65537 and $k = \lfloor n_s/2 \rfloor$, $n_s$ is
the slot number within a radio frame.
The RNTI value used for $n_{RNTI}$ is defined in subclause 7.1 in downlink and
subclause 8 in uplink.

According to the definition of the search space for the PDCCH, the terminal-specific search space is not explicitly signaled, but is implicitly defined through a function by a terminal identity and a subframe number. In other words, the terminal-specific search space is changeable according to a subframe number, which means that the terminal-specific search space is changeable according to the time. Thereby, a problem (defined as a blocking problem) in which a particular terminal cannot use a search space due to other terminals is solved. If all CCEs for which the terminal searches have already been used by other terminals scheduled within the same subframe and no terminal can be scheduled in the corresponding subframe, the search space is changed according to the time and thus this problem may not occur in the subsequent subframe. For example, even though terminal-specific search spaces of terminal #1 and terminal #2 partially overlap each other in a particular subframe, the terminal-specific search space is changed according to the subframe, and thus it may be expected that overlapping in the subsequent subframe will be different.

According to the definition of the search space for the PDCCH, since terminals in a predetermined group or all terminals should receive the PDCCH, the common search space is defined as a pre-appointed set of CCEs. In other words, the common search space is not changed according to the terminal identity or the subframe number. Although the common search space exists for transmission of various system messages, the common search space may be used to transmit control information of an individual terminal. Accordingly, the common search space may be used to solve the problem in which resources available in the terminal-specific search space are insufficient and thus terminals cannot be scheduled.

The search space is a set of candidate control channels including CCEs for which the terminal should attempt decoding at the given aggregation level, and there are several aggregation levels at which a set of CCEs is configured by 1, 2, 4, and 8 CCEs, so that the terminal has a plurality of search spaces. The number of PDCCH candidates which the terminal should monitor within the search space according to the aggregation level in the LTE PDCCH is defined as shown in [Table 2] below.

TABLE 2

| Type | Search space $S_k(L)$ | | Number of PDCCH candidates $M^{(L)}$ |
|---|---|---|---|
| | Aggregation level L | Size [in CCEs] | |
| UE-specifc | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In [Table 2], the terminal-specific search space supports aggregation levels 1, 2, 4, and 8 and has 6, 6, 2, and 2 PDCCH candidates, respectively. The common search space 302 supports aggregation levels 4 and 8 and has 4 and 2 PDCCH candidates, respectively. The reason why the common search space supports only aggregation levels 4 and 8 is that coverage characteristics are generally good when a system message reaches a cell edge.

DIC transmitted to the common search is defined only for a system message or a particular DCI format, such as 0/1A/3/3A/1C, corresponding to the purpose of power control for a terminal group. Within the common search space, a DCI format having spatial multiplexing is not supported. A downlink DCI format, which should be decoded in the UE-specific search space, varies depending on the transmission mode configured for the corresponding UE. Since the configuration of the transmission mode is performed through RRC signaling, a subframe number indicating whether the corresponding configuration is valid for the corresponding terminal is not accurately specified. Accordingly, the terminal may operate to maintain communication by always decoding DCI format 1A regardless of the transmission mode.

The method of transmitting and receiving the downlink control channel and the downlink control information and the search space in LTE and LTE-A have been described.

Hereinafter, a downlink control channel in a 5G communication system, which is currently under discussion, will be described in more detail with reference to the drawings.

Figure 3:
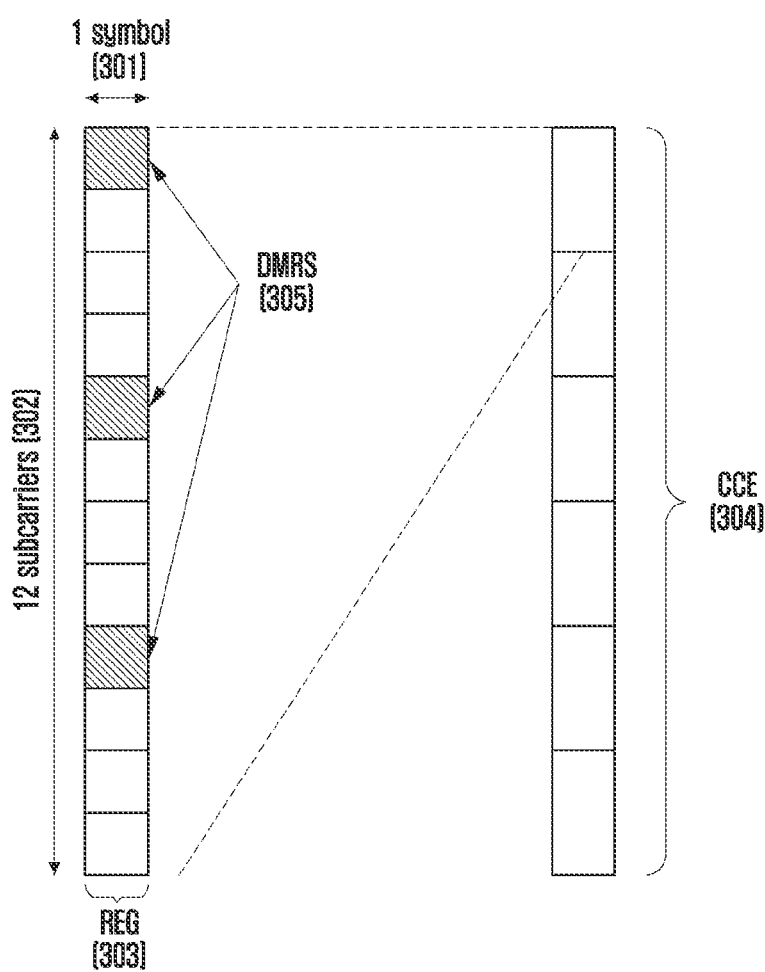
FIG. 3 illustrates transmission resources of a downlink control channel in 5G.

FIG. 3 illustrates an example of a basic unit of time and frequency resources included in a downlink control channel that can be used in 5G. In FIG. 3, a basic unit (REG) of time and frequency resources included in a control channel includes 1 OFDM symbol 301 in the time axis and 12 subcarriers 302, that is, 1RB in the frequency axis. In the configuration of the basic unit of the control channel, a data channel and a control channel can be multiplexed on the time axis within one subframe on the basis of assumption that the basic unit on the time axis is 1 OFDM symbol 301. It is easy to satisfy the delay time requirements through a decrease in processing time of the user by placing the control channel ahead of the data channel. It is possible to more efficiently perform frequency multiplexing between the control channel and the data channel by configuring the basic unit on the frequency axis of the control channel as 1 RB 302.

By concatenating REGs 303 illustrated in FIG. 3, various sizes of control channel regions may be configured. For example, when a basic unit of allocation of the downlink control channel in 5G is a CCE 304, 1 CCE 304 may consist of a plurality of REGs 303. By way of example of the REG 304 illustrated in FIG. 3, the REG 303 may include 12 REs, and when 1 CCE 304 consists of 6 REGs 303, 1 CCE 304 may include 72 REs. When a downlink control region is configured, the corresponding region may include a plurality of CCEs 304, and a particular downlink control channel may be mapped to one or a plurality of CCEs 304 according to an aggregation level (AL) within the control region and then transmitted. CCEs 304 within the control region may be distinguished by numbers and the numbers may be assigned according to a logical mapping scheme.

The basic unit of the downlink control channel illustrated in FIG. 3, that is, the REG 303, may include all REs to which the DCI is mapped and the region to which a DMRS 305, which is a reference signal for decoding the REs, is mapped. As illustrated in FIG. 3, the DMRS 305 may be transmitted in 3 REs within 1 REG 303. For reference, since the DMRS 305 is transmitted using precoding such as a control signal mapped within the REG 303, the terminal is able to perform decoding control information without any information on which precoding is applied by the base station.

Figure 4:
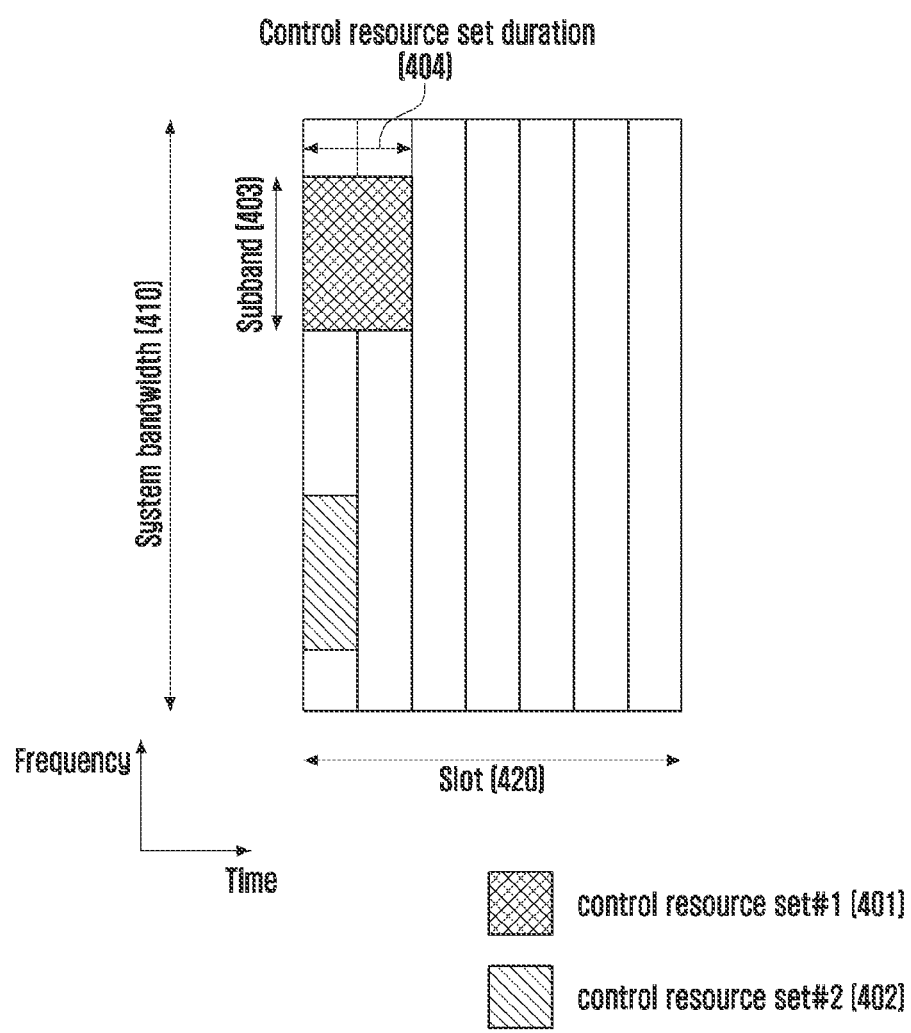
FIG. 4 illustrates an example of the configuration of a CORESET in 5G.

FIG. 4 illustrates an example of a control region (control resource set (CORESET)) in which a downlink control channel is transmitted in a 5G wireless communication system. FIG. 4 illustrates an example in which two CORESETs (control region #1 401 and control region #2 402) are configured within a system bandwidth 410 in the frequency axis and 1 slot 420 in the time axis (it is assumed that 1 slot consists of 7 OFDM symbols in the example of FIG. 4). The CORESETs 401 and 402 may be configured as particular subbands 403 in an entire system bandwidth 410 on the frequency axis. The CORESETs 404 and 402 may be configured as one or a plurality of OFDM symbols in the time axis, which may be defined as a control region length (control resource set duration) 404. In the example of FIG. 4, CORESET #1 401 is configured as the control region length of two symbols and CORESET #2 402 is configured as the control region length of one symbol.

The control regions in 5G may be configured through higher-layer signaling (for example, system information, a master information block (MIB), or radio resource control (RRC) signaling) from the base station to the terminal. From the point of view of the terminal, configuration of the CORESETs means provision of information such as locations of CORESETs, subbands, resource allocation of CORESETs, and CORESET duration. For example, information shown in [Table 3] below may be included.

TABLE 3

Configuration information 1. Frequency axis RB allocation information
Configuration information 2. CORESET start symbol
Configuration information 3. CORESET symbol duration
Configuration information 4. REG bundling size (2, 3, or 6)
Configuration information 5. Transmission mode (interleaved transmission scheme or non-interleaved transmission scheme)
Configuration information 6. DRMS configuration information (precoder granularity)
Configuration information 7. Search space type (common search space, group-common search space, and UE-specific search space)
Configuration information 8. DCI format to be monitored in corresponding CORSET
Others Various pieces of other information required for transmitting the downlink control channel may be configured in the terminal as well as the above-listed configuration information.

Subsequently, downlink control information (DCI) in 5G will be described in detail.

Scheduling information for uplink data (physical uplink shared channel (PUSCH)) or downlink data (physical downlink shared channel (PDSCH)) in the 5G system is transferred from the base station to the terminal through DCI. The terminal may monitor a fallback DCI format and anon-fallback DCI format for the PUSCH or the PDSCH. The fallback DCI format may be configured as a fixed field between the base station and the terminal, and the non-fallback DCI format may include a configurable field.

The fallback DCI for scheduling the PUSCH may include, for example, information shown in [Table 4] below

TABLE 4

Identifier for DCI formats - [1] bit
Frequency domain resource assignment - 
$[\lceil \log_2 (N_{RB}^{UL, BWP} (N_{RB}^{UL, BWP} + 1)/2) \rceil]$ bits
Time domain resource assignment - X bits
Frequency bopping flag - 1 bit.
Modulation and coding scheme - [5] bits
New data indicator - 1 bit
Redundancy version - [2] bits
HARQ process number - [4] bits
TPC command for scheduled PUSCH - [2] bits
UL/SUL indicator - 0 or 1 bit The non-fallback DCI for scheduling the PUSCH may include, for example, information shown in [Table 5] below.

TABLE 5

- Carrier indicator—0 or 3 bits
- Identifier for DCI formats—[1] bits
- Bandwidth part indicator—0, 1 or 2 bits
- Frequency domain resource assignment
  • For resource allocation type 0, $\lceil N_{RB}^{UL,BWP}/P \rceil$ bits
  • For resource allocation type 1,
    $\lceil \log_2(N_{RB}^{UL,BWP}(N_{RB}^{UL,BWP} + 1)/2) \rceil$ bits
- Time domain resource assignment—1, 2, 3, or 4 bits
- VRB-to-PRB mapping—0 or 1 bit, only for resource allocation type 1.
  • 0 bit if only resource allocation type 0 is configured;
  • 1 bit otherwise.
- Frequency hopping flag—0 or 1 bit:, only for resource allocation type 1.
  • 0 bit if only resource allocation type 0 is configured;
  • 1 bit otherwise.
- Modulation and coding scheme—5 bits
- New data indicator—1 bit
- Redundancy version—2 bits as defined in section xx of [6, TS38.214]
- HARQ process number—4 bits
- 1st downlink assignment index—1 or 2 bits
  • 1 bit for semi-static HARQ-ACK codebook;
  • 2 bits for dynamic HARQ-ACK codebook with single HARQ-ACK codebook.
- 2nd downlink assignment index—0 or 2 bits
  • 2 bits for dynamic HARQ-ACK codebook with two HARQ-ACK
    sub-codebooks;
  • 0 bit otherwise.
- TPC command for scheduled PUSCH—2 bits

- SRS resource indicator—$\left\lceil \log_2\left(\sum_{k=1}^{L_{max}} \binom{N_{SRS}}{k}\right)\right\rceil$ or $\lceil \log_2(N_{SRS}) \rceil$ bits

• $\left\lceil \log_2\left(\sum_{k=1}^{L_{max}} \binom{N_{SRS}}{k}\right)\right\rceil$ bits for non-codebook based PUSCH transmission;
  • $\lceil \log_2 (N_{SRS}) \rceil$ bits or codebook based PUSCH transmission.
- Precoding information and number of layers—up to 6 bits
- Antenna ports—up to 5 bits
- SRS request—2 bits
- CSI request—0, 1 2, 3, 4, 5, or 6 bits
- CBG transmission information—0, 2, 4, 6, or 8 bits TABLE 5-continued

- PTRS-DMRS association—2 bits.
- beta_offset indicator—2 bits
- DMRS sequence initialization—0 or 1 bit
- UL/SUL indicator—0 or 1 bit The fallback DCI for scheduling the PDSCH may include, for example, information shown in [Table 6] below.

TABLE 6

Identifier for DCI formats - [1] bit
Frequency domain resource assignment -
[[$\log_2 (N_{RB}^{DL, BWP} (N_{RB}^{DL, BWP} + 1)/2)$]] bits
Time domain resource assignment - X bits
VRB-to-PRB mapping - 1 bit.
Modulation and coding scheme - [5] bits
New data indicator - 1 bit
Redundancy version - [2] bits
HARQ process number - [4] bits
Downlink assignment index - 2 bits
TPC command for scheduled PUCCH - [2] bits
PUCCH resource indicator - [2] bits
PDSCH-to-HARQ feedback timing indicator - [3] bits The non-fallback DCI for scheduling the PDSCH may include, for example, information shown in [Table 7] below.

TABLE 7

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL, BWP}/P \rceil$ bits
For resource allocation type 1,
$\lceil \log_2 (N_{RB}^{RBDL, BWP} (N_{RB}^{DL, BWP} + 1)/2) \rceil$ bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 1 bit
Rate matching indicator - 0, 1, 2 bits
ZP CSI-RS trigger - X bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 4 bits
TPC command for scheduled PUCCH - 2 bits
PUCCH resource indicator
PDSCH-to-HARQ_feedback timing indicator - 3 bits
Antenna ports - up to 5 bits
Transmission configuration indication - 3 bits
SRS request - 2 bits
CBG transmission information - 0, 2, 4, 6, or 8 bits
CBG flushing out information - 0 or 1 bit
DMRS sequence initialization - 0 or 1 bit The DCI may be transmitted through a physical downlink control channel (PDCCH) corresponding to a downlink physical control channel via a channel coding and modulation process. A cyclic redundancy check (CRC) is added to a DCI message payload and is scrambled with a radio network temporary identifier (RNTI) corresponding to the identity of the terminal. Depending on the purpose of the DCI message, for example, terminal (UE)-specific data transmission, a power control command, or a random access response, different RNTIs are used. The RNTI is not explicitly transmitted, but is transmitted in the state of being included in a CRC calculation process. If the DCI message transmitted through the PDCCH is received, the terminal may identify the CRC through the allocated RNTI, and may recognize that the corresponding message is transmitted to the terminal when the CRC is determined to be correct on the basis of the CRC identification result.

For example, DCI for scheduling the PDSCH for system information (SI) may be scrambled with an SI-RNTI. DCI for scheduling a PDSCH for a random access response (RAR) message may be scrambled with an RA-RNTI. DCI for scheduling a PDSCH for a paging message may be scrambled with a P-RNTI. DCI for notifying of a slot format indicator (SFI) may be scrambled with an SFI-RNTI. DCI for notifying of transmit power control (TPC) may be scrambled with a TPC-RNTI. DCI for scheduling a UE-specific PDSCH or PUSCH may be scrambled with a Cell RNTI (C-RNTI).

Figure 5:
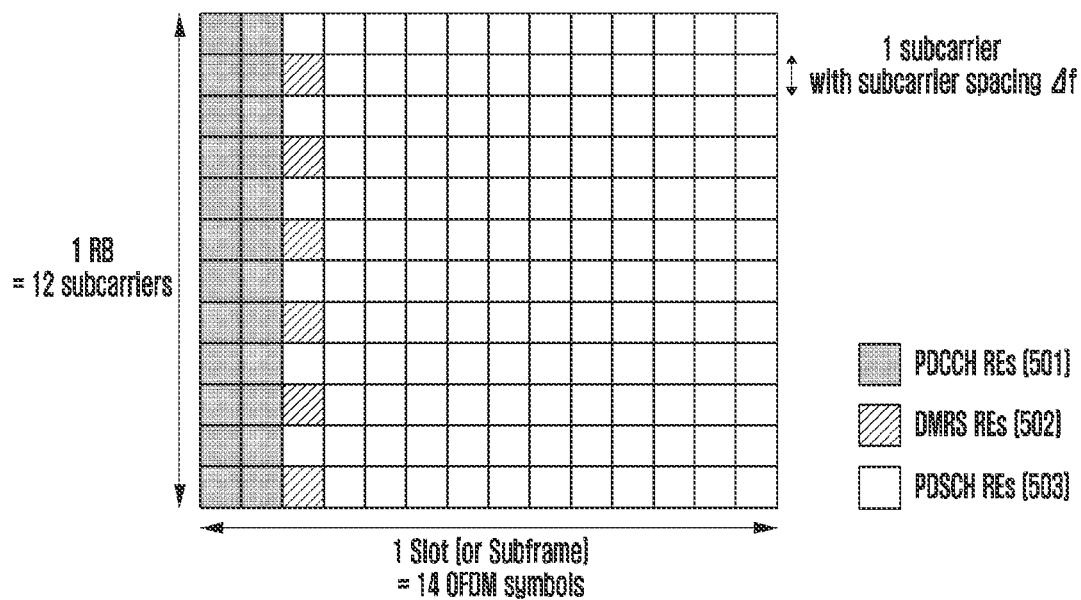
FIG. 5 illustrates an example of the configuration for a downlink RB structure in 5G.

When a specific terminal receives scheduling of a data channel, that is, the PUSCH or the PDSCH through the PDCCH, data may be transmitted and received along with the DMRS within the corresponding scheduled resource region. In FIG. 5, a specific terminal uses 14 OFDM symbols as 1 slot (or subframe) in the downlink, and a PDCCH is transmitted through the first two OFDM symbols and a DMRS is transmitted in a third symbol. In FIG. 5, PDSCHs are mapped to REs in which no DMRS is transmitted in a third symbol and to REs in fourth to last symbols and transmitted within a specific RB in which PDSCHs are scheduled. Subcarrier spacing $\Delta f$ in FIG. 5 is 15 kHz in the LTE and LTE-A systems and uses one of {15, 30, 60, 120, 240, 480} kHz in the 5G system.

In order to effectively implement the 5G system, the terminal is required to accurately measure a channel state and the size of interference and transmit channel state information generated using the same to the base station. The base station receiving the channel state information may determine terminals to which data is transmitted on the basis of the channel state information, a data transmission rate at which the data is transmitted, and precoding to be applied.

Figure 6:
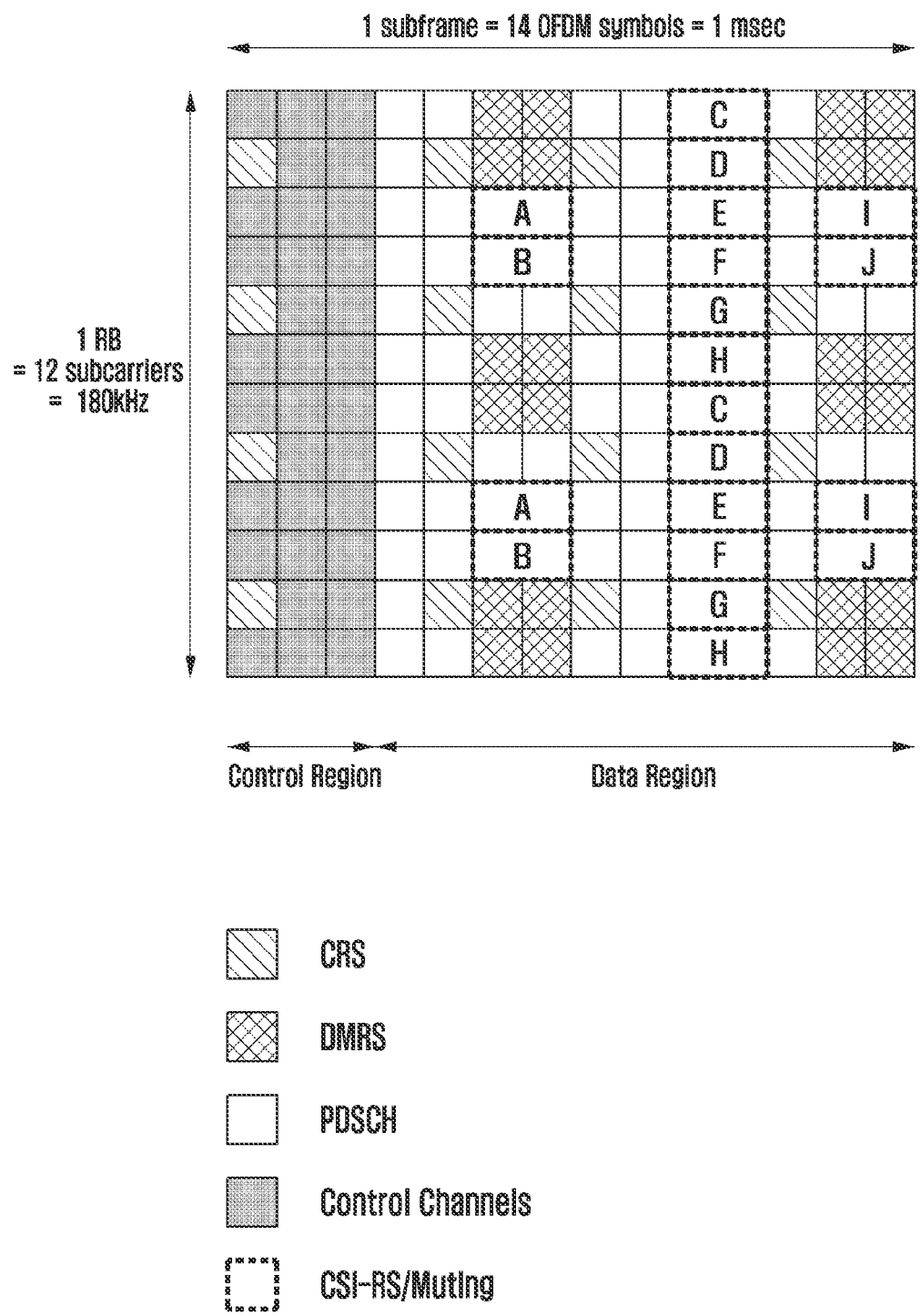
FIG. 6 illustrates the configuration of a subframe.

A plurality of different types of signals below may be transmitted through radio resources illustrated in FIG. 6.

1. Cell-specific reference signal (CRS): refers to a reference signal periodically transmitted for all terminals belonging to one cell and may be commonly used by a plurality of terminals.

2. Demodulation reference signal (DMRS): refers to a reference signal transmitted for a specific terminal and may be transmitted only when data is transmitted to the corresponding terminal. The DMRS may include a total of 8 DMRS ports. DMRS ports in LTE/LTE-A may correspond to port 7 to port 14, and the ports may maintain orthogonality to avoid interference therebetween through code division multiplexing (CDM) or frequency division multiplexing (FDM).

3. Physical downlink shared channel (PDSCH): refers to a downlink channel used to transmit traffic (or data) from the base station to the terminal. The base station may transmit data through an RE in which no reference signal is transmitted in a data region (or a PDSCH region) of FIG. 6.

4. Channel state information reference signal (CSI-RS): refers to a reference signal transmitted for terminals belonging to one cell and may be used to measure a channel state. Further, a plurality of CSI-RSs may be transmitted in one cell.

5. Other control channels (physical downlink control channel (PDCCH), physical hybrid-ARQ indicator channel (PHICH), and physical control format indicator channel (PCFICH): the base station may provide control information required when the terminal receives data through the PDSCH or transmit ACK/NACK for operating HARQ for uplink data transmission.

In addition to the above signals, the base station may configure muting in the LTE-A system in order to allow the CSI-RS transmitted by another base station to be received by terminals in the corresponding cell. The muting may be applied in a location where the CSI-RS can be transmitted and the terminal may generally hop the corresponding radio resource and receive a traffic signal. In the LTE-A system, the muting is also called a zero-power CSI-RS. This is because the muting is applied to the location of the CSI-RS and no transmission power is transmitted due to a characteristic of the muting. In FIG. 6, CSI-RSs may be transmitted using some of the locations marked by A, B, C, D, E, F, G, H, I, and J according to the number of antennas for transmitting the CSI-RSs. Further, the muting may be applied to some of the locations marked by A, B, C, D, E, F, G, H, I, and J.

Particularly, CSI-RSs may be transmitted through 2, 4, or 8 REs according to the number of antenna ports for transmission. In FIG. 6, the CSI-RSs are transmitted to a half of a specific pattern when the number of antenna ports is 2, the CSI-RSs are transmitted to the entire of the specific pattern when the number of antenna ports is 4, and the CSI-RSs are transmitted using two patterns when the number of antenna ports is 8.

In the case of the muting, always one pattern unit is made. That is, the muting may be applied to a plurality of patterns, but cannot be applied to a portion of one pattern when the muting doe not overlap the location of the CSI-RS. However, only when the location of the CSI-RS and the location of the muting overlap each other, the muting may be applied to only a portion of the one pattern. When CSI-RSs for two antenna ports are transmitted, the base station may transmit signals of the respective antenna ports in two REs connected in the time axis and the signals of the respective antenna ports may be divided by orthogonal codes. When CSI-RSs for four antenna ports are transmitted, signals for two additional antenna ports may be transmitted through two REs in additional to the CSI-RSs for two antenna ports. In the case in which CSI-RSs for 8 antenna ports are transmitted, the same method may be used.

Meanwhile, as described above, the base station should transmit a reference signal to measure a downlink channel state in a cellular system. In the case of the long term evolution advanced (LTE-A) system of 3GPP, the terminal may measure a channel state between the base station and the terminal on the basis of a CRS or a CSI-RS transmitted by the base station. The channel state should be measured in consideration of various factors, which may include an amount of interference in the downlink. The amount of interference in the downlink may include an interference signal generated by an antenna belonging to a neighboring base station, a thermal noise, and the like, which is important when the terminal determines a channel state in the downlink. For example, when one base station having one transmission antenna transmits a signal to one terminal having one reception antenna, the terminal is required to decide Es/Io by determining energy per symbol which can be received in the downlink through the reference signal received from the base station and an amount of interference simultaneously received in a section where the corresponding symbol is received. The determined Es/Io is converted into a data transmission rate or a value corresponding thereto and transmitted to the base station in the form of a channel quality indicator (CQI). Then, the base station may determine a data transmission rate at which the base station performs transmission to the terminal in the downlink.

In the LTE-A system, the terminal transmits feedback of information on the channel state of the downlink to the base station and use the information for downlink scheduling of the base station. That is, the terminal measures a reference signal transmitted by the base station in the downlink and transmits feedback of information extracted from the measured reference signal to the base station in the form defined by the LTE/LTE-A standard. As described above, the information fed back by the terminal in LTE/LTE-A may be referred to as channel state information, and the channel state information may include three pieces of information below.

Rank indicator (RI): indicates the number of spatial layers which the terminal can receive in the current channel state Precoding matrix indicator (PMI): indicates an indicator of a precoding matrix preferred by the terminal in the current channel state Channel Quality Indicator (CQI): indicates a maximum data rate at which the terminal can perform reception in the current channel state The CQI may be replaced with a signal to interference plus noise ratio (SINR), a maximum error correction code rate and modulation scheme, data efficiency per frequency, and the like, which can be used similarly to the maximum data transmission rate.

The RI, PMI, and CQI have meanings associated with each other. For example, the precoding matrix supported by LTE/LTE-A is differently defined according to each rank. Therefore, Y of a PMI value when the RI has a value of 1 is differently analyzed from Y of a PMI value when the RI has a value of 2. Further, it is assumed that Y of the PMI value of which the terminal notifies the base station is applied when the terminal determines the CQI. That is, reporting RI_X, PMI_Y, and CQI_Z to the base station by the terminal corresponds to reporting that the corresponding terminal can perform reception at a data transmission rate corresponding to CQI_Z when the rank is RI_X and the PMI is PMI_Y. As described above, in calculating the CQI, the terminal considers which transmission scheme is used for the base station and optimal performance can be acquired when actual transmission is performed using the corresponding transmission scheme.

In LTE/LTE-A, the RI, the PMI, and the CQI that are channel state information fed back by the terminal may be fed back periodically or aperiodically. When the base station desires to aperiodically acquire channel state information of a specific terminal, the base station may configure aperiodic feedback (or an aperiodic report on channel state information) using an aperiodic feedback indicator (or a channel state information request field or channel state information request information) included in downlink control information (DCI) for the terminal. Further, when receiving an indicator configured to transmit aperiodic feedback in an $n^{th}$ subframe, the terminal may perform uplink transmission including aperiodic feedback information (or channel state information) in data transmission in an $n+k^{th}$ subframe. Here, k denotes a parameter defined in the 3GPP LTE Release 11 standard, which is 4 in frequency division duplexing (FDD), and may be defined as shown in [Table 8] in time division duplexing (TDD).

[Table 8] is a table showing values of k for subframe number n in TDD UL/DL configuration.

TABLE 8

| TDD UL/DL Configuration | \multicolumn{10}{c}{subframe number n} | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When aperiodic feedback is configured, the feedback information (or channel state information) may include the RI, the PMI, and the CQI, and the RI and the PMI may not be fed back according to the feedback configuration (or channel state report configuration). However, when the aperiodic feedback is configured as described above, the terminal reports an aperiodic CSI on the basis of periodically measured channel state information but the aperiodic CSI may be inaccurate.

Hereinafter, embodiments of the disclosure will be described in detail with reference to the accompanying drawings. The LTE or LTE-A system will be described by way of example in the following embodiments of the disclosure, but the embodiments of the disclosure can also be applied to other communication systems having a similar technical background or channel form. For example, $5^{th}$-generation mobile communication technology (5G, new radio, and NR), developed after LTE-A, may be included therein. Accordingly, embodiments of the disclosure may be modified without departing from the scope of the disclosure, and may be applied to other communication systems based on a determination by those skilled in the art.

Further, in the following description of the disclosure, a detailed description of known functions and configurations incorporated herein will be omitted when it may make the subject matter of the disclosure rather unclear. The terms used below are terms defined in consideration of the functions in the disclosure, and may differ according to users, intentions of the users, or customs. Therefore, the definitions of the terms should be made based on the contents throughout the specification.

As described above, various services can be provided according to the development of the wireless communication systems, and thus a method of smoothly providing the services is required. Particularly, in the 5G communication system, introduction of a method by which the terminal performs transmission and reception while sharing the same time and frequency resources in order to support very high frequency efficiency and connectivity.

The disclosure considers a method of transmitting much more data in a given frequency band by overlappingly transmitting a multicast signal and a unicast signal.

Figure 7:
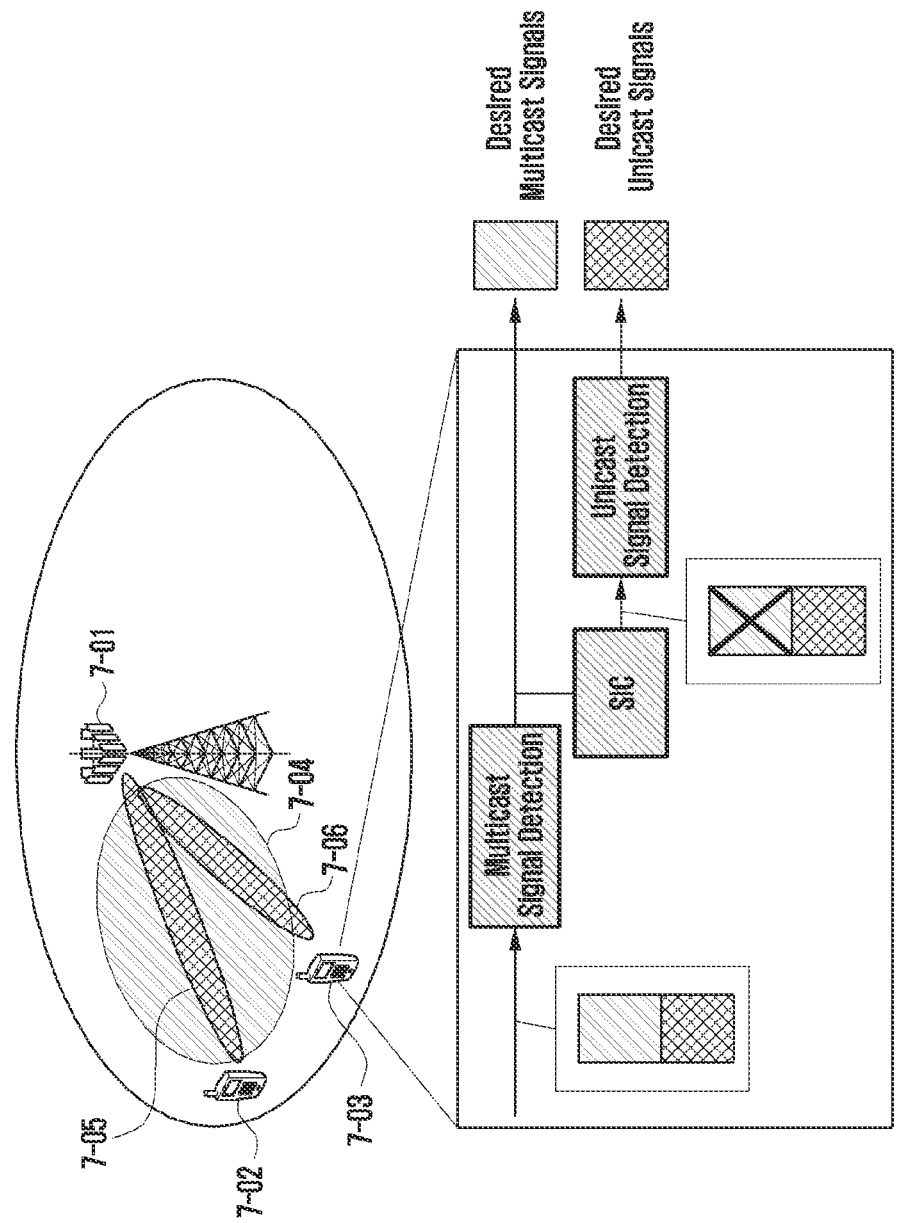
FIG. 7 illustrates an embodiment of a communication system to which the disclosure is applied.

FIG. 7 illustrates a system considering overlapping transmission of a multicast signal and a unicast signal.

FIG. 7 illustrates an example of a system including a base station 7-01, terminal #1 7-02, terminal #2 7-03, a multicast beam 7-04, a unicast beam 7-05 for terminal #1 7-02, and a unicast beam 7-06 for terminal #2 7-03. The base station 7-01 may overlappingly transmit a multicast signal and a unicast signal in the same time and frequency resources. For example, the base station 7-01 may transmit an overlapping signal to terminal #1 7-02 through the multicast beam 7-04 and the unicast beam 7-05 for terminal #1 in specific time and frequency resources, and transmit an overlapping signal to terminal #2 7-03 through the multicast beam 7-05 and the unicast beam 7-06 for terminal #2 7-03 in other specific time and frequency resources.

As illustrated in FIG. 7, terminal #2 7-03 may receive an overlapping signal of the multicast beam 7-04 and the unicast beam 7-06, and may detect a multicast signal from the overlapping signal through multicast signal detection and process the multicast signal detected from the overlapping signal as interference to apply an interference cancellation scheme. For example, terminal #2 7-03 may cancel the detected multicast signal from the overlapping signal through a successive interference cancellation (SIC) algorithm and detect a unicast signal on the basis of a signal from which the multicast signal is cancelled.

When time-frequency resources allocated to the multicast signal and the unicast signal overlap each other, the terminal may determine it as an overlapping transmission mode of the multicast signal and the unicast signal. For example, in step 904, the terminal may first demodulate the multicast signal and perform an operation of cancelling interference, which the multicast signal gives to the unicast signal, and then perform an operation of receiving by demodulating the unicast signal. For example, the terminal may demodulate the unicast signal by cancelling the demodulated multicast signal from the received signal.

Figure 8:
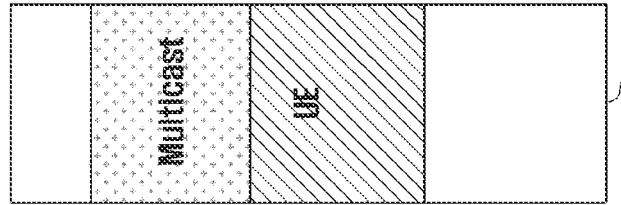
FIG. 8 illustrates an embodiment, in which a multicast signal and a unicast signal overlap, to which the disclosure is applied.

FIG. 8 illustrates resource allocation considering overlapping transmission of a multicast signal and a unicast signal.

Referring to FIG. 8, in the case 8-01 of a conventional example in which the multicast signal and the unicast signal are not overlappingly transmitted, the base station may allocate the multicast signal and the unicast signal to different time and frequency resources to perform transmission and reception. Cases in which the multicast signal and the unicast signal are overlappingly transmitted may include the following embodiments. Cases in which the multicast signal and the unicast signal are overlappingly transmitted may include the case 8-02 in which only some time and frequency resources overlap, the case 8-03 in which time and frequency resources allocated to the unicast signal are included in time and frequency resources allocated to the multicast signal, and the case 8-04 in which time and frequency resources allocated to the multicast signal are included in time and frequency resources allocated to the unicast signal.

Further, resource allocation considering overlapping transmission of multicast signals scheduled for a plurality of terminals and a unicast signal scheduled for each of the plurality of terminals may be included.

First Embodiment

Figure 9:
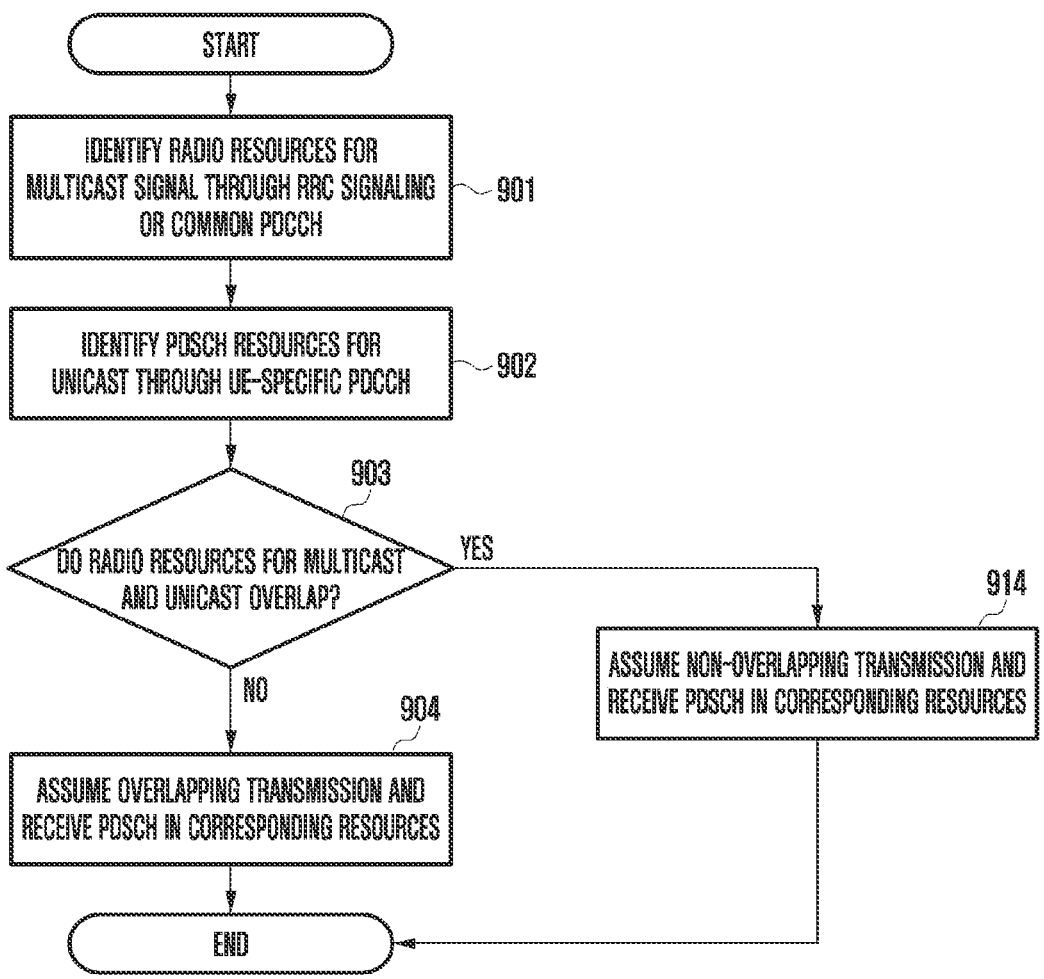
FIG. 9 illustrates a terminal procedure according to an embodiment of the disclosure.

<First embodiment> of the disclosure describes an operation in which the terminal receives an overlapping signal of a multicast signal and a unicast signal with reference to FIG. 9.

The terminal may determine whether time and frequency resources for multicast signals are allocated in step 901.

For example, a method by which the terminal determines whether time and frequency resources for a multicast signal are allocated may include a method by which the terminal identifies radio resources for a multicast signal through RRC signaling or common control information (common PDCCH) such as method 1 or method 2 described below.

[Method 1]

The terminal may determine time-frequency resource allocation for a multicast signal through high-layer signaling (for example, RRC signaling). The terminal may identify time-frequency resource domains for the multicast signal, and information on a signal period, a modulation scheme, and a code rate through high-layer signaling.

[Method 2]

The terminal may determine time-frequency resource allocation for a multicast signal through common control information. A common control information part may include fields corresponding to control information which can be applied in common to all terminals detecting the corresponding DCI, and may include, for example, DCI fields corresponding to time and frequency resource allocation information. The base station may allocate the same time and frequency resources for multicast signals to a plurality of terminals, and the terminals may perform an operation for demodulating the multicast signals in scheduled time and frequency resources. Accordingly, the base station may notify a plurality of terminals receiving the multicast signals of the same time and frequency allocation information through the DCI.

The terminal may determine whether time and frequency resources for unicast signals are allocated in step 902.

For example, a method by which the terminal determines whether time and frequency resources for unicast signals are allocated may include a method by which the terminal identifies radio resources for the unicast signal through terminal-specific control information (UE-specific PDCCH). The terminal-specific control information may include DCI fields corresponding to, for example, time and frequency resource allocation information. The base station may allocate time and frequency resources for unicast signal according to respective terminals, and the terminals may perform an operation for demodulating the unicast signals in scheduled time and frequency resources. Accordingly, the base station may notify of time and frequency allocation information through the DCI according to each terminal receiving the unicast signal. The terminal-specific control information is control information for each terminal, and each terminal may know which bit corresponds to the terminal itself among the terminal-specific control information through higher-layer configuration (for example, RRC signaling, system information, or MAC CE signaling) from the base station.

The terminal may determine whether to apply an overlapping transmission mode of the multicast signal and the unicast signal in step 903.

For example, a method by which the terminal determines whether to apply the overlapping transmission mode of the multicast signal and the unicast signal may include a method by which the terminal identifies an overlapping part through comparison between time and frequency resources allocated to the multicast signal and time and frequency resources allocated to the unicast signal identified in step 901 and step 902. When time and frequency resources overlap each other on the basis of the identification result, the terminal may determine that the multicast signal and the unicast signal are overlappingly transmitted.

When time-frequency resources allocated to the multicast signal and the unicast signal overlap each other in step 903, the terminal may determine an overlapping transmission mode of the multicast signal and the unicast signal, assume overlapping transmission in step 904, and receive a PDSCH (downlink data) in overlapping radio resources.

For example, the terminal may first demodulate the multicast signal and perform an operation for cancelling interference, which the multicast signal gives to the unicast signal, and then perform an operation of receiving by demodulating the unicast signal. For example, the terminal may demodulate the unicast signal by cancelling the demodulated multicast signal from the received signal.

When time-frequency resources allocated to the multicast signal and the unicast signal do not overlap each other in step 903, the terminal may determine the conventional transmission mode, assume non-overlapping transmission in step 914, and receive a PDSCH (downlink data) in each of the radio resources.

For example, the terminal may perform the conventional reception operation for separately demodulating the multicast signal and the unicast signal.

The disclosure proposes a data mapping method of efficiently transmitting and receiving overlapping transmission data when the multicast signal and the unicast signal are overlappingly transmitted. In an aspect of the disclosure, a method by which the terminal transmits and receives downlink data is provided. The method may include a step of receiving a control channel signal including resource allocation information through a specific time region in a subframe having a plurality of time domains, and include a method of mapping neighboring data of a unicast signal-related DMRS (hereinafter, interchangeable with a U-DMRS) and a multicast signal-related DMRS (hereinafter, interchangeable with a M-DMRS) for the multicast signal and the unicast signal.

Second Embodiment

The <Second embodiment> of the disclosure considers a data mapping method of efficiently transmitting and receiving overlapping transmission data when the multicast signal and the unicast signal are overlappingly transmitted and a reception operation of the terminal corresponding thereto.

As described in the <First embodiment>, terminals receiving multicast signals may demodulate the multicast signals, cancel interference influence of the multicast signal on the unicast signal, and demodulate the unicast signal. At this time, when the terminal demodulates the multicast signal, if the multicast signal overlaps a U-DMRS of another terminal, considerable interference may be generated. In order to reinforce decoding of the multicast signal, the base station may support the following data mapping method.

When mapping data on the multicast signal, the base station may use zero power (for example, puncturing for a part to which the U-DMRS can be mapped) for the multicast signal in corresponding resources in order to prevent multicast signal transmission in the part to which U-DMRSs of terminals can be mapped. The base station may configure a set including information on the location of at least one resource to which the U-DMRS can be mapped to allow the terminal to efficiently decode the multicast signal and transmit information thereon to terminals.

On the other hand, since information on the M-DMRS may be identified by terminals receiving the multicast signals through RRC signaling or common control information, data may be sequentially mapped to the multicast signals near the M-DMRS (for example, rate matching near the M-DMRS).

Information on the set to which U-DMRSs of the terminals can be mapped may be transmitted through high-layer signaling (for example, RRC signaling) or common control information. Specifically, for a random terminal, the base station may inform the terminal of at least one resource to which U-DMRSs of terminals can be mapped. For example, the base station may transmit information on the location of at least one resource to which the U-DMRS can be mapped to the terminal as set information. At this time, for a random terminal, the base station may transmit the set information to the terminal through RRC signaling. At least one resource to which the U-DMRS can be mapped may be candidate resources to which U-DMRSs can be mapped. Accordingly, the base station may transmit set information for candidate resources to the terminal through RRC signaling.

The base station may inform the terminal that the location of at least one resource to which the U-DMRS can be mapped included in the transmitted set information is the location of resources to which a U-DMRS of another terminal is mapped through signaling. For example, the base station may transmit information indicating resources through which the U-DMRS of another terminal is transmitted among the candidate resources through the DCI.

Figure 10:
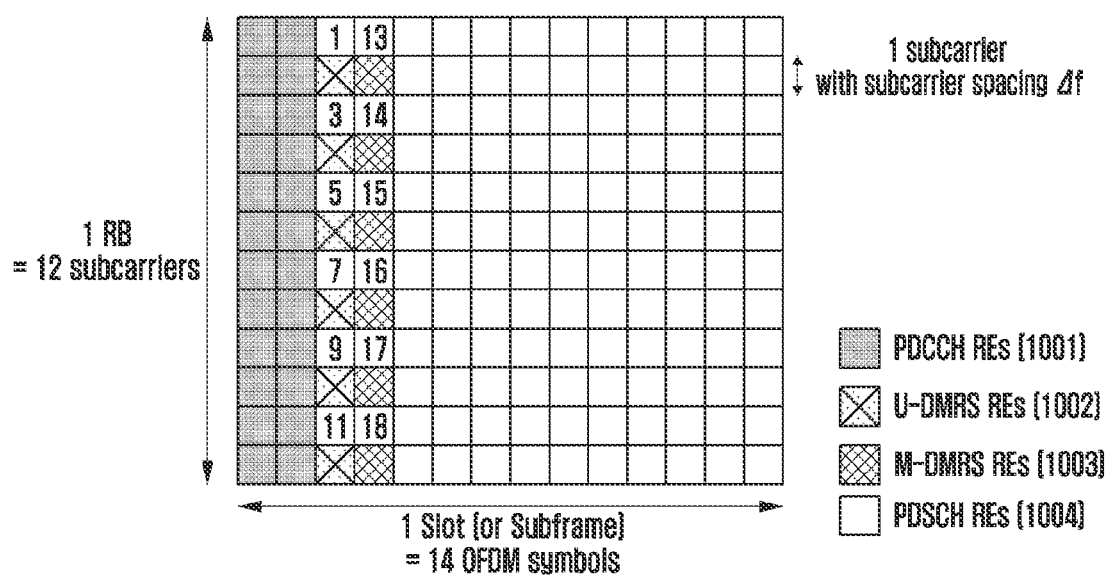
FIG. 10 illustrates mapping of data on a multicast signal according to an embodiment of the disclosure.

FIG. 10 illustrates a method of mapping multicast signals according to an embodiment of the disclosure. Referring to FIG. 10, when mapping data on multicast signals, the base station may use zero power (for example, puncturing) for multicast signals in regions (for example, regions corresponding to X in FIG. 10) to which U-DMRSs can be mapped. The base station may sequentially map data on multicast signals near M-DMRSs (for example, rate matching). For example, as illustrated in FIG. 10, the base station may map data on multicast signals in the order of (1, X, 3, X, 5, X, 7, X, 9, X, 11, X, 13, 14, 15, 16, 17, 18, . . . ).

A method by which the terminal demodulates the multicast signal is described below.

[Method 1]

When the terminal may identify a region to which the U-DMRS can be mapped through higher-layer signaling, the terminal may fill X values in (1, X, 3, X, 5, X, 7, X, 9, X, 11, X, 13, 14, 15, 16, 17, 18, . . . ) with 0 and perform decoding.

Alternatively, the terminal may receive the set information through higher-layer signaling. Further, the terminal may receive information on the region to which the U-DMRS for another terminal can be mapped through the DCI. At this time, the terminal may decode a multicast signal on the basis of the assumption of a specific value (for example, 0) in the identified region. Meanwhile, when the information on the region to which the U-DMRS for another terminal cannot be mapped is not identified through the DCI, the terminal may decode the multicast signal on the basis of the assumption of the specific value (for example, 0) in all regions included in the set information.

[Method 2]

When the terminal cannot identify the region to which the U-DMRS can be mapped through high-layer signaling, the terminal may perform decoding on the basis of the assumption that there is data (for example, U-DMRS) in the X values of (1, X, 3, X, 5, X, 7, X, 9, X, 11, X, 13, 14, 15, 16, 17, 18, . . . ).

For example, although the terminal receives the set information, the terminal may not receive information on resources through which the mapped U-DMRS for another terminal is transmitted in the set information. At this time, the terminal may determine that the region to which the U-DMRS can be mapped cannot be identified, and decode the multicast signal on the basis of the assumption that there is data in candidate resources of the unicast DMRS mapping resources included in the set information.

In other words, when decoding the multicast signal, the terminal may extract data from no. 1 which is the RE part followed by PDCCH REs 1001, assume a specific value for U-DMRS REs 1002 to which the U-DMRS can be mapped, and decode all PDSCH REs including PDSCH REs 1004 near M-DMRS REs 1003.

Meanwhile, a method of mapping data on the unicast signal and decoding of the unicast signal of the terminal according to an embodiment of the disclosure are described with reference to FIG. 11. As described above, the terminal may identify M-DMRS information through RRC signaling or common control information and U-DMRS information through terminal-specific control information. Accordingly, the base station may sequentially map data on the unicast signal to the vicinity of the U-DMRS and the M-DMRS (for example, rate matching). According to the embodiment illustrated in FIG. 11, the base station may map data on the unicast signal in the order of (1, 2, 3, 4, 5, 6, 7, 8, 9, 10, 11, 12, . . . ).

Figure 11:
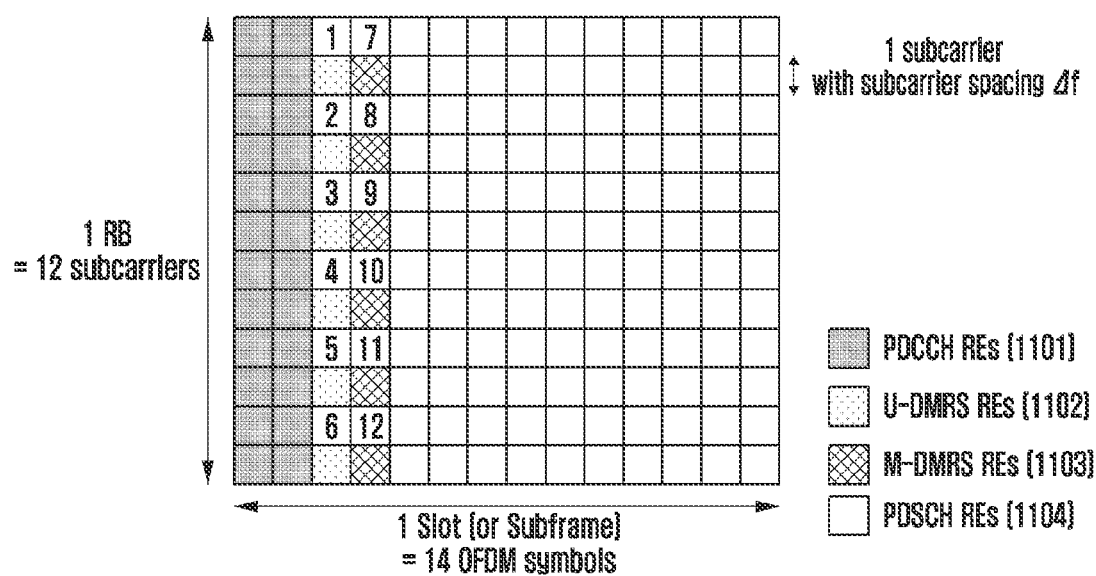
FIG. 11 illustrates mapping of data on a unicast signal according to an embodiment of the disclosure.

In an example in which the terminal decodes the unicast signal, the decoding may be performed in the order of (1, 2, 3, 4, 5, 6, 7, 8, 9, 10, 11, 12, . . . ) in FIG. 11. For example, when decoding the unicast signal, the terminal extracts data from no. 1 which is the RE part followed by PDCCH REs 1301, and decodes all PDSCH REs including U-DMRS REs 1302 and PDSCH REs 1304 near M-DMRS REs 1303.

Figure 12:
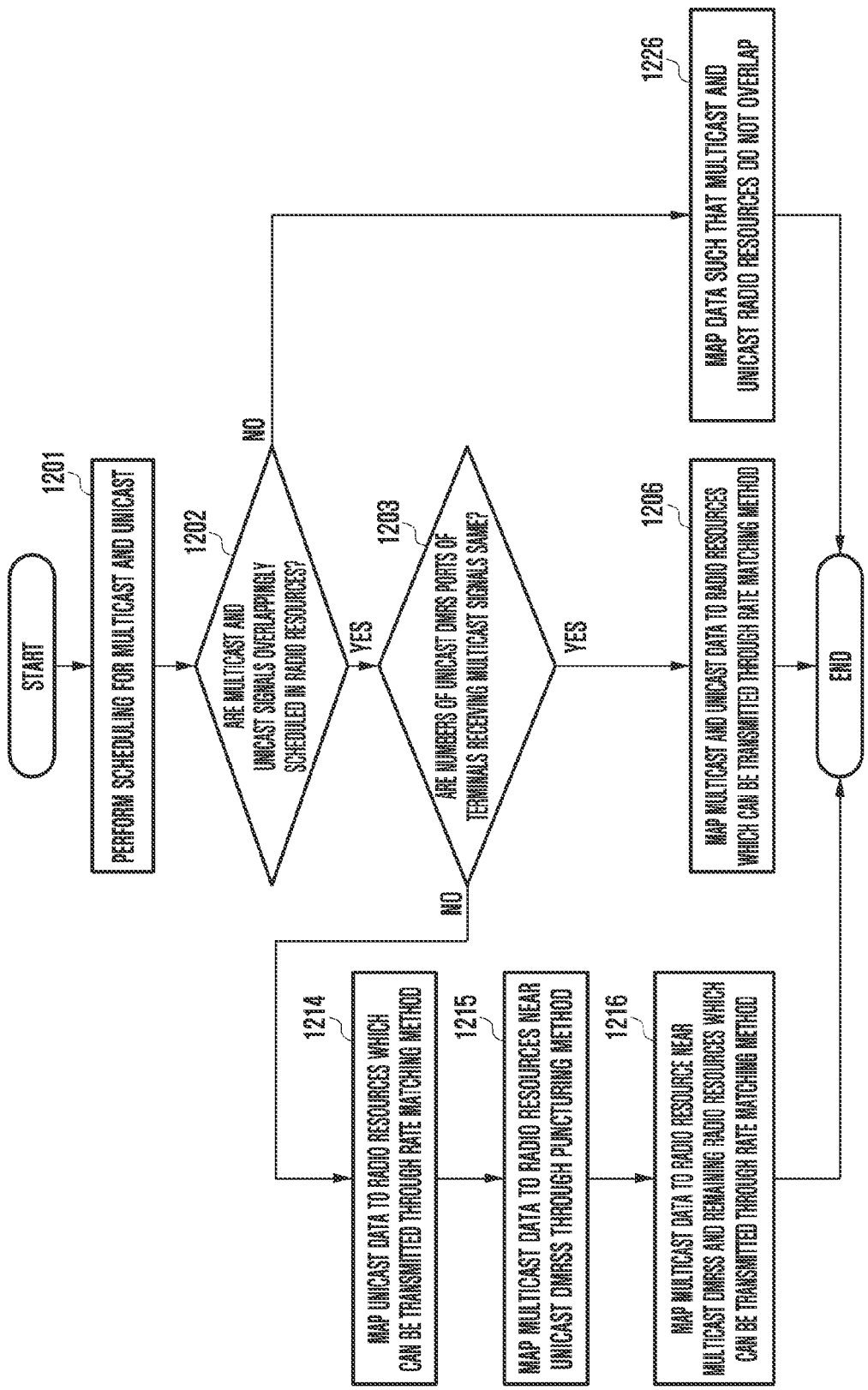
FIG. 12 is a flowchart illustrating a method of controlling a base station according to an embodiment of the disclosure.

According to an embodiment of the disclosure, a method by which the base station maps multicast and unicast data is described with reference to FIG. 12. First, the base station may schedule a multicast signal and a unicast signal in step 1201. The base station may identify whether to overlappingly transmit the multicast signal and the unicast signal in radio resources in step 1202. For example, the base station may identify whether the multicast signal and the unicast signal are overlappingly scheduled in radio resources.

When overlapping transmission is not performed on the basis of the determination result, for example, when the multicast signal and the unicast signal are not overlappingly scheduled in radio resources in step 1202, the base station may proceed to step 1226 and perform the conventional method of mapping multicast data to radio resources for multicast and unicast data to radio resources for unicast.

When the multicast signal and the unicast signal are overlappingly transmitted, for example, when the multicast signal and the unicast signal are overlappingly scheduled in radio resources in step 1202, the base station may identify whether the numbers of unicast DMRSs of terminal receiving multicast signals, that is, the numbers of U-DMRS ports are the same in step 1203.

When the numbers of U-DMRS ports of terminals are the same in step 1203, respective terminals may know U-DMRS locations of other terminals. Accordingly, the base station may map multicast and unicast data to radio resources which can be transmitted through a rate matching method in step 1206. For example, the radio resources which can be transmitted may include the remaining radio resources other than U-DMRS resource and M-DMRS resource locations. That is, the base station may not map data to U-DMRS resource and M-DMRS resource locations and may sequentially map data on overlapping signals including the unicast signal and the multicast signal to the remaining radio resources other than the U-DMRS resource and M-DMRS resource location. When the numbers of U-DMRS ports of terminals are different in step 1203, methods of mapping data on the multicast signal and the unicast signal may be different.

For example, the base station may map data to radio resources which can be transmitted through a rate matching method as the method of mapping data on the unicast signal in step 1214. For example, the radio resources which can be transmitted may include the remaining radio resources other than the U-DMRS and M-DMRS resource locations.

On the other hands, the base station may map multicast data to radio resources near the U-DMRSs through a puncturing method as the method of mapping data on the multicast signal in step 1215. For example, the base station may puncture the locations of U-DMRS resources and map multicast data to resources near the U-DMRSs that are the remaining radio resources other than the U-DMRS resource locations.

Further, the base station may map multicast data to the radio resources near the M-DMRSs and the remaining radio resources which can be transmitted through the rate matching method in step 1216. For example, the base station may not map data to the M-DMRS locations and map multicast data to resources near the M-DMRSs that are the remaining radio resources other than the M-DMRS locations.

The reason why the multicast data is mapped through puncturing in step 1215 is to more accurately decode the multicast signal in consideration of the fact that there may be a U-DMRS of another UE when the multicast signal is demodulated in overlapping transmission of multicast and unicast data.

In order to effectively implement the system for overlappingly transmitting the multicast signal and the unicast signal, the terminal is required to accurately measure a channel state and the size of interference and transmit channel state information generated using the same to the base station. The base station receiving the channel state information may determine terminals to which data is transmitted on the basis of the channel state information, a data transmission rate at which the data is transmitted, and precoding to be applied.

In accordance with an aspect of the disclosure, a method by which a terminal transmits channel state information (CSI) in a wireless communication system supporting overlapping transmission of a multicast signal and a unicast signal may include a step of reporting, to a base station, a first precoding matrix indicator (PMI) indicating a precoding matrix most preferred by the terminal and a first channel quality indicator (CQI) calculated on the basis of the assumption of the use of the first PMI for a unicast channel when the multicast signal and the unicast signal are not overlappingly transmitted (for example, a conventional case without background multicast).

The method may include a step of reporting, to the base station, a second PMI indicating a precoding matrix most preferred by the terminal and a second CQI calculated on the basis of the assumption of the use of the second PMI for a unicast channel when the multicast signal and the unicast signal are overlappingly transmitted (for example, there is background multicast).

The first PMI, the first CQI, the second PMI, and the second CQI may be calculated on the basis of a rank indicator (RI) reported to the base station from the terminal. The periodicity and/or granularity of the first PMI and the first CQI may be the same as the periodicity and/or granularity of the second PMI and the second CQI.

In order to calculate the second PMI and the second CQI for a unicast channel when the multicast signal and the unicast signal are overlappingly transmitted, the base station may notify the terminal of additional information through the following methods.

[Method 1]

M-CSI-RSs for measuring multicast channels may be allocated, and the base station may notify the terminal of relevant Multicast to M-CSI-RS EPRE (Energy per Resource Element) ratio ($\gamma$)

[Method 2]

The base station may notify the terminal of Unicast PDSCH to Multicast EPRE ratio ($\alpha$)—through higher-layer RRC signaling or group-common control information.

Third Embodiment

Figure 13:
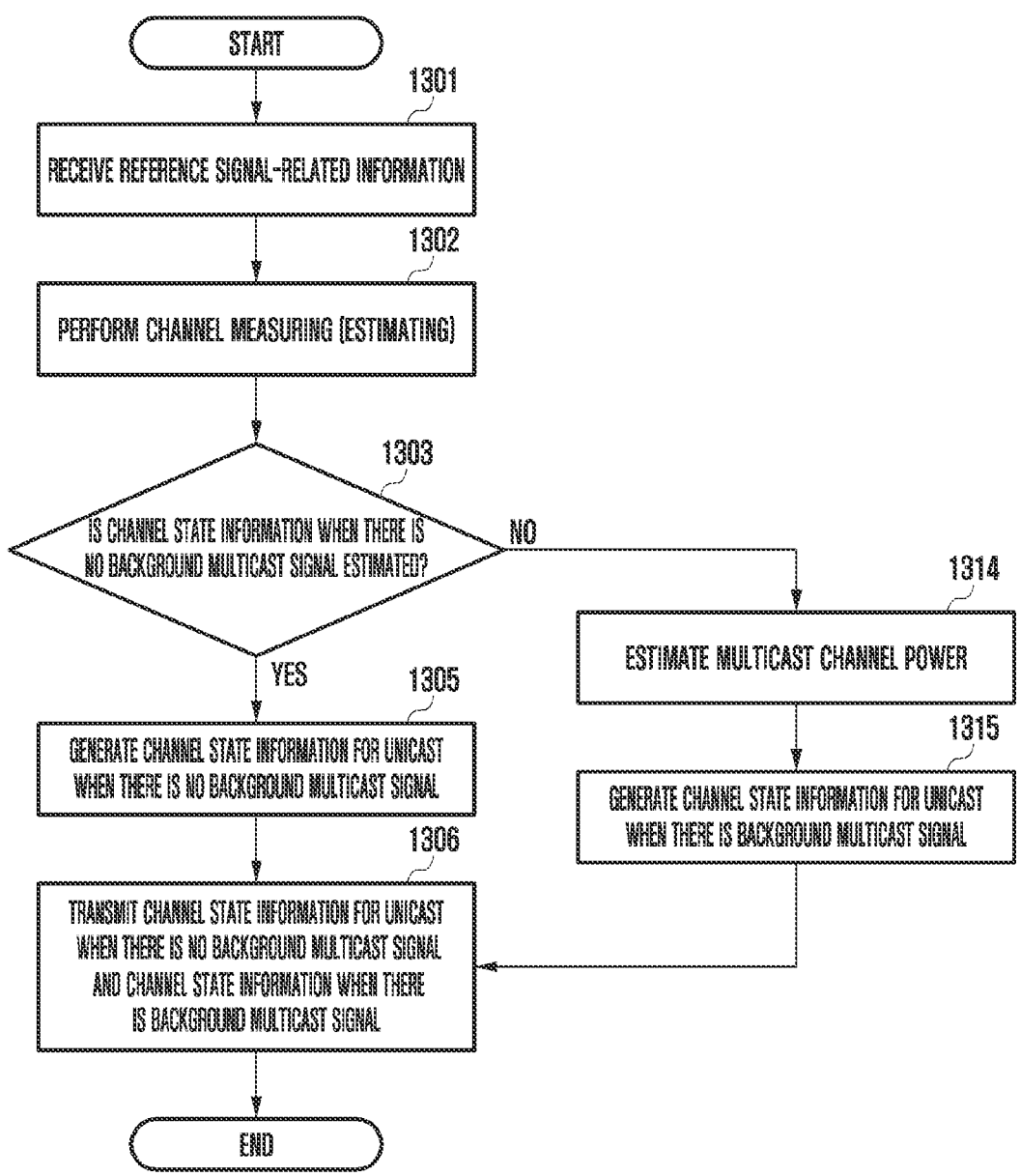
FIG. 13 is a flowchart illustrating a method by which a terminal generates and transmits channel state information for unicast channels when there is no background multicast signal and there is the background multicast signal according to an embodiment of the disclosure.

The <Third embodiment> of the disclosure describes an operation of generating and transmitting channel state information for unicast channels when there is no background multicast signal and there is the background multicast signal with reference to FIG. 13.

Referring to FIG. 13, the terminal may receive reference signal-related information in step 1301. The terminal may measure a unicast channel on the basis of the received CSI-RS in step 1302.

The terminal may acquire information related to resources through which the reference signal is transmitted using the reference signal-related information. The terminal may identify whether the reference signal is transmitted through the reference signal-related information on the basis of downlink control information. When the reference signal-related information includes a plurality of pieces of reference signal configuration information, the terminal may identify which reference signal configuration information is used on the basis of the downlink control information. Accordingly, the terminal may measure (estimate) the channel by receiving the reference signal in the identified resources.

The method by which the terminal measuring (estimating) unicast channels generates channel state information for unicast varies depending on whether the case in which there is background multicast or the case in which there is no background multicast is considered in step 1303. When the conventional case without background multicast is considered, the terminal may calculate the first PMI and the first CQI in step 1305. On the other hand, when the case in which there is background multicast is considered, the terminal may estimate multicast channel power according to [Method 1] or [Method 2] in step 1314. The terminal may calculate the second PMI and the second CQI in step 1315. The terminal may transmit channel state information (the first PMI and the first CQI) when there is no background multicast and channel state information (the second PMI and the second CQI) when there is background multicast to the base station in step 1306.

Figure 14:
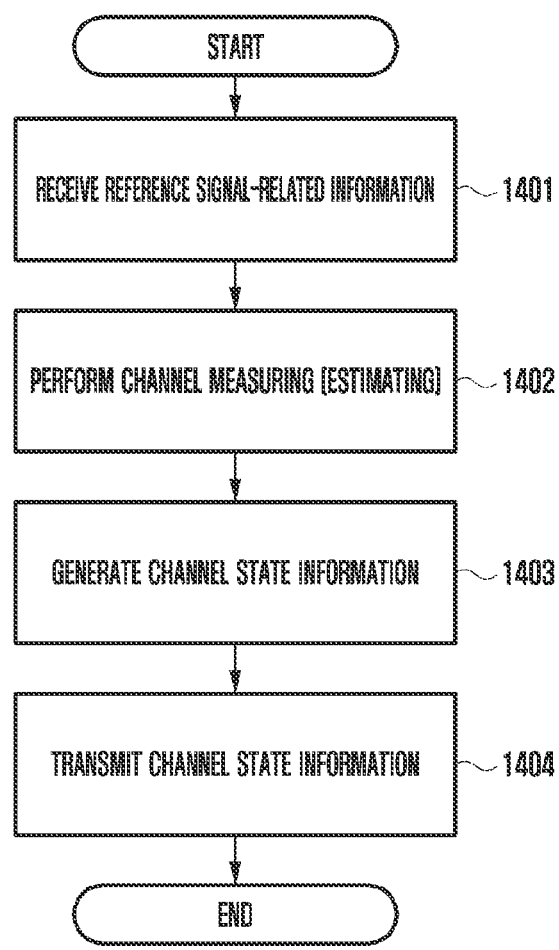
FIG. 14 illustrates an operation related to channel state information of the terminal according to an embodiment of the disclosure.

<Third embodiment> of the disclosure describes an operation for generating and transmitting channel state information for unicast channels when there is no background multicast signal and there is the background multicast signal with reference to FIG. 14.

Referring to FIG. 14, the terminal may receive reference signal-related information in step 1401 and measure (estimate) a channel through the received CSI-RS in step 1402. The terminal may acquire information related to resources to which the reference signal is transmitted on the basis of the reference signal-related information and identify whether the reference signal is transmitted through the reference signal-related information on the basis of downlink control information. When the reference signal-related information includes a plurality of pieces of reference signal configuration information, the terminal may identify which reference signal configuration information is used on the basis of the downlink control information. Accordingly, the terminal may measure (estimate) the channel by receiving the reference signal in the identified resources.

The terminal measuring (estimating) the channel may generate channel state information in step 1403. The terminal may transmit the channel state information to the base station in step 1404.

Specifically, an example of an operation in which the terminal considering the case in which there is no background multicast signal calculates the first PMI and the first CQI is described with reference to FIG. 14. The terminal uses a reference-related signal for unicast (hereinafter, interchangeable with a U-CSI-RS) to measure a unicast channel in step 1401. [Equation 1] shows a maximum data transmission rate when there is no background multicast signal, which is an example of the reference for determining channel state information.

$$C_{Unicast} = W\log_2\left(1 + \frac{U(n)}{WN_0}\right) \quad \text{[Equation 1]}$$

W denotes a bandwidth allocated to the terminal, and U(n) denotes unicast power when $n^{th}$ precoding is applied at a given rank (rank-r). The terminal may obtain an optimal first PMI by measuring (estimating) a channel using a U-CSI-RS port through, for example, [Equation 2] in step 1402.

$$n^* = \arg\max_n C_{Unicast}(n) \quad \text{[Equation 2]}$$

A first CQI is a data transmission rate, which can be supported by the terminal, generated on the basis of the assumption that the previously preferred precoding in the case in which there is no background multicast signal is applied. [Equation 2] shows a maximum data transmission rate which is an example of the reference for determining the first CQI.

$$C_{Unicast}(n^*) = W\log_2\left(1 + \frac{U(n^*)}{WN_0}\right) \quad \text{[Equation 3]}$$

U(n*) denotes unicast power when the previously preferred $n^*_{th}$ precoding is applied. The terminal may compare a maximum data transmission rate obtained through [Equation 3] with a predefined CQI threshold and determine a data transmission rate which can be supported in the current channel state as a first CQI in step 1403, and then report the first PMI and the first CQI to the base station in step 1404.

<Method 1>

<Embodiment 3-1> of the disclosure considers the case in which a reference-related signal for multicast (hereinafter, interchangeable with an M-CSI-RS) is allocated to measure influence of the multicast signal on the unicast signal when there is the background multicast signal. An operation in which the terminal following <Embodiment 3-1> of the disclosure calculates a second PMI and a second CQI is described with reference to FIG. 14.

The terminal identifies M-CSI-RS resources allocated by the base station and calculates an M-CSI-RS EPRE in step 1401. [Equation 4] shows Multicast PDSCH to M-CSI-RS EPRE ratio (γ) notified by the base station.

γ denotes a ration of energy per PDSCH resource element (energy per resource element (EPRE)) of the multicast signal notified by the base station to the CSI-RS EPRE.

$$\gamma = \frac{PDSCH_{Multicast} EPRE}{M-CSI-RS\ EPRE} \quad \text{[Equation 4]}$$

Through [Equation 4], the terminal calculates influence of the multicast signal on the unicast signal (for example, power of the multicast signal $PDSCH_{Multicast}$ EPRE=γM-CSI-RS EPRE) and demodulates multicast. [Equation 5] shows a maximum transmission rate of the unicast signal when there is the background multicast signal.

$$C_{Unicast} = W\log_2\left(1 + \frac{U}{WN_0 + M}\right) \quad \text{[Equation 5]}$$

M denotes multicast power. [Equation 6] shows a maximum transmission rate of a unicast channel after the multicast signal is demodulated.

$$C_{Unicast} = W\log_2\left(1 + \frac{U(n)}{WN_0 + I_{res}}\right) \quad \text{[Equation 6]}$$

$I_{res}$ denotes interference left due to incomplete demodulation of the multicast signal. The terminal may obtain an optimal second PMI after demodulating the background multicast signal through, for example, [Equation 7] in step 1403.

$$n^* = \arg\max_n C_{Unicast}(n) \quad \text{[Equation 7]}$$

A second CQI is a data transmission rate, which can be supported by the terminal, generated on the basis of the assumption that the previously preferred precoding in the case in which there is the background multicast signal is applied. [Equation 8] shows a maximum data transmission rate which is an example of the reference for determining the second CQI.

$$C_{Unicast}(n^*) = W\log_2\left(1 + \frac{U(n^*)}{WN_0 + I_{res}}\right) \quad \text{[Equation 8]}$$

U(n*) denotes unicast power when the previously preferred $n^*_{th}$ precoding is applied. The terminal may compare a maximum data transmission rate obtained through [Equation 8] with a predefined CQI threshold and determine a data transmission rate which can be supported in the current channel state as a second CQI in step 1403, and then report the second PMI and the second CQI to the base station in step 1404.

<Method 2>

<Embodiment 3-2> of the disclosure considers the case in which the base station notifies the terminal of Unicast PDSCH to Multicast PDSCH EPRE ratio (α) in order to measure influence of interference of the multicast signal on the unicast signal when there is the background multicast signal. <Embodiment 3-2> considers the case in which numbers of antenna ports of the multicast signal and the unicast signal are the same. An operation in which the terminal following <Embodiment 3-2> of the disclosure calculates a second PMI and a second CQI is described with reference to FIG. 14.

The terminal identifies U-CSI-RS resources allocated by the base station and estimates a unicast channel in step 1402. [Equation 9] shows Unicast PDSCH to Multicast PDSCH EPRE ratio (α) notified by the base station. α denotes a ration of energy per PDSCH resource element (energy per resource element (EPRE)) of the unicast signal notified by the base station to the PDSCH EPRE of the multicast signal.

$$\alpha = \frac{PDSCH_{Unicast}EPRE}{PDSCH_{Multicast}EPRE} \quad \text{[Equation 9]}$$

Through [Equation 9], the terminal calculates influence of interference of the multicast signal on the unicast signal (for example, power of the multicast signal $PDSCH_{Multicast}$ EPRE=$PDSCH_{Unicast}$ ERPE/α) and demodulates multicast. [Equation 10] shows a maximum transmission rate of the unicast signal when there is the background multicast signal.

$$C_{Unicast} = W\log_2\left(1 + \frac{U}{WN_0 + M}\right) \quad \text{[Equation 10]}$$

M(=αU) denotes multicast power. [Equation 11] shows a maximum transmission rate of a unicast channel after the multicast signal is demodulated.

$$C_{Unicast} = W\log_2\left(1 + \frac{U(n)}{WN_0 + I_{res}}\right) \quad \text{[Equation 11]}$$

$I_{res}$ denotes interference left due to incomplete demodulation of the multicast signal. The terminal may obtain an optimal second PMI after demodulating the background multicast signal through, for example, [Equation 12] in step 1403.

$$n^* = \arg\max_n C_{Unicast}(n) \quad \text{[Equation 12]}$$

A second CQI is a data transmission rate, which can be supported by the terminal, generated on the basis of the assumption that the previously preferred precoding in the case in which there is the background multicast signal is applied. [Equation 8] shows a maximum data transmission rate which is an example of the reference for determining the second CQI.

$$C_{Unicast}(n^*) = W\log_2\left(1 + \frac{U(n^*)}{WN_0 + I_{res}}\right) \quad \text{[Equation 13]}$$

U(n*) denotes unicast power when the previously preferred $n^*_{th}$ precoding is applied. The terminal may compare a maximum data transmission rate obtained through [Equation 13] with a predefined CQI threshold and determine a data transmission rate which can be supported in the current channel state as a second CQI in step 1403, and then report the second PMI and the second CQI to the base station in step 1204.

<Method 3>

<Embodiment 3-3> of the disclosure considers the case in which the base station notifies the terminal of Unicast PDSCH to Multicast PDSCH EPRE ratio (α) in order to measure influence of interference of the multicast signal on the unicast signal when there is the background multicast signal. <Embodiment 3-3> considers the case in which numbers of antenna ports of the multicast signal and the unicast signal are different. An operation in which the terminal following <Embodiment 3-3> of the disclosure calculates a second PMI and a second CQI is described with reference to FIG. 14.

The terminal identifies U-CSI-RS resources allocated by the base station and estimates a unicast channel in step 1402. [Equation 14] shows Unicast PDSCH to Multicast PDSCH EPRE ratio (α) notified by the base station.

$$\alpha = \frac{PDSCH_{Unicast}EPRE}{PDSCH_{Multicast}EPRE} \quad \text{[Equation 14]}$$

When numbers of antenna ports of the multicast signal and the unicast signal are different, the base station may additionally transmit information on antenna port mapping in order to detect influence of interference of the multicast signal on the unicast signal. For example, the case in which the number of antenna ports of the unicast signal is 4 and the number of antenna ports of the multicast signal is 2 is considered. When the base station multiplies a precoding matrix $W_1$ when generating unicast signals of 4 antenna ports (for example, $HW_1=H_U$) and multiplies a matrix $W_2$ when generating multicast signals of 2 antenna ports (for example, $HW_2=H_M$), if the base station transmits information on $W_1^{-1}W_2$ to the terminal, the terminal may calculate multicast signal power M=αU' after calculating unicast power U'=g(U) mapped to the 4 antenna ports and then mapped to 2 antenna ports.

A method by which the base station transmits antenna port mapping information (for example, $W_1^{-1}W_2$) to the terminal is described below.

The base station defines matrixes indicated by the product of $W_1^{-1}$ and $W_2$ as a set for antenna port mapping and transmits index information related to information on one matrix among the matrixes $W_1^{-1}W_2$ to the terminal.

As described above, the terminal may calculate the second PMI and the second CQI of the unicast channel through [Equation 10] to [Equation 13] in step 1403 and report the second PMI and the second CQI to the base station in step 1404.

Figure 15:
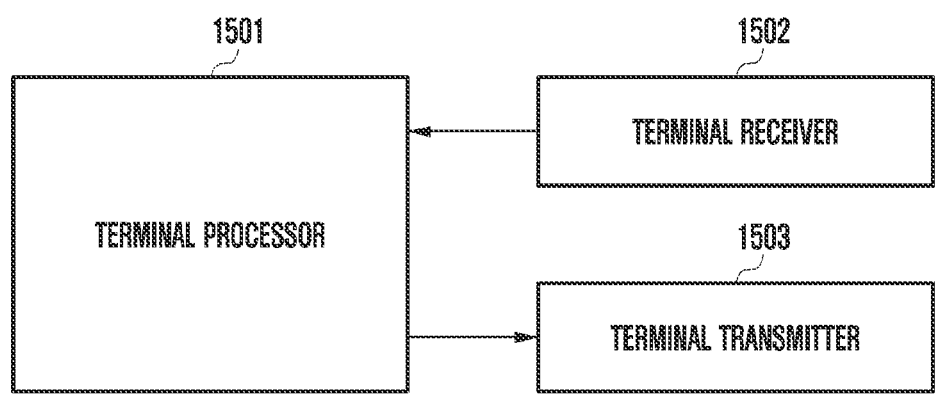
FIG. 15 is a block diagram illustrating the internal structure of the terminal according to an embodiment of the disclosure.
Figure 16:
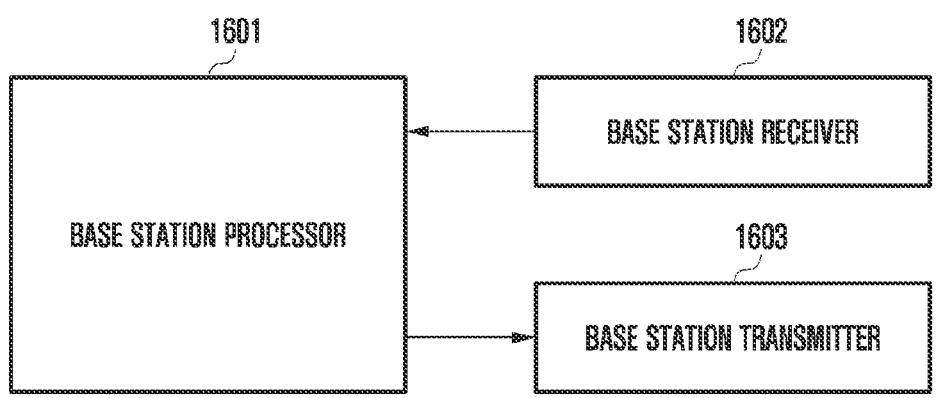
FIG. 16 is a block diagram illustrating the internal structure of the base station according to an embodiment of the disclosure.

Transmitters, receivers, and controllers of the terminal and the base station are illustrated in FIGS. 15 and 16, respectively, to implement the embodiments of the disclosure. Transmission and reception methods of the base station and the terminal to apply methods of transmitting and receiving a downlink control channel and a data channel in the communication system corresponding to the embodiments are illustrated, and transmitters, receivers, and processors of the base station and the terminal should operate according to embodiments to implement the same.

Specifically, FIG. 15 is a block diagram illustrating the internal structure of the terminal according to an embodiment of the disclosure. As illustrated in FIG. 15, the terminal according to the disclosure may include a terminal processor 1501, a receiver 1502, and a transmitter 1503.

The terminal processor 1501 may control a series of processes under which the terminal may operate according to the embodiments of the disclosure. For example, the terminal processor 1501 may differently control a method of receiving a downlink control channel using an overlapping signal of a multicast signal and a unicast signal and transmitting and receiving a reference signal (RS) and a data channel according to an embodiment of the disclosure. The terminal receiver 1502 and the terminal transmitter 1503 are commonly called a transceiver in the embodiments of the disclosure. The transceiver may transmit and receive a signal to and from the base station. The signal may include control information and data. To this end, the transceiver includes an RF transmitter that up-converts and amplifies the frequency of a transmitted signal, an RF receiver that low-noise amplifies a received signal and down-converts the frequency, and the like. Also, the transceiver may receive a signal through a radio channel, output the signal to the terminal processor 1501, and transmit the signal output from the terminal processor 1501 through a radio channel.

According to an embodiment of the disclosure, the terminal processor 1501 may control the transceiver to receive information on unicast demodulation reference signal (DMRS) mapping resources. The terminal processor 1501 may decode the multicast signal in the received signal on the basis of the received information and decode the unicast signal on the basis of the received signal and the decoded multicast signal.

The terminal processor 1501 may control the transceiver to receive set information including candidate resources of the unicast DMRS mapping resources through higher-layer signaling.

When the terminal processor 1501 can identify resources which are being currently used for transmission of the unicast DMRS among candidate resources of the unicast DMRS mapping resources included in the set information, the terminal processor 1501 may decode the multicast signal on the basis of the assumption of a specific value for the location of the unicast DMRS mapping resources.

When the terminal processor 1501 cannot identify resources which are being currently used for transmission of the unicast DMRS among candidate resources of the unicast DMRS mapping resources included in the set information, the terminal processor 1501 may decode the multicast signal except for candidate resources of the unicast DMRS mapping resources.

The terminal processor 1501 may decode the unicast signal by cancelling the decoded multicast signal from the received signal.

FIG. 16 is a block diagram illustrating the internal structure of the base station according to an embodiment of the disclosure. As illustrated in FIG. 16, the base station according to the disclosure may include a base station processor 1601, a receiver 1602, and a transmitter 1603.

The base station processor 1601 may control a series of processes such that the base station operates according to the embodiments of the disclosure. For example, the base station processor 1601 may differently control methods of allocating a downlink control channel using a multicast and unicast overlapping signal and mapping and transmitting and receiving an RS and data channel resources according to an embodiment of the disclosure. The base station receiver 1602 and the base station transmitter 1603 are commonly called a transceiver in embodiments of the disclosure. The transceiver may transmit and receive a signal to and from the terminal. The signal may include control information and data. To this end, the transceiver includes an RF transmitter that up-converts and amplifies the frequency of a transmitted signal, an RF receiver that low-noise amplifies a received signal and down-converts the frequency, and the like. Also, the transceiver may receive a signal through a radio channel, output the signal to the base station processor 1601, and transmit the signal output from the base station processor 1601 through a radio channel.

According to an embodiment of the disclosure, when the multicast signal and the unicast signal are overlappingly transmitted, the base station processor 1601 may control the transceiver to transmit information on demodulation reference signal (DMRS) mapping resources. The base station processor 1601 may map the multicast signal to resources in consideration of the unicast DMRS mapping resources and control the transceiver to transmit the multicast signal.

The base station processor 1601 may control the transceiver to transmit set information indicating candidate resources of the unicast DMRS mapping resource through higher-layer signaling.

The base station processor 1601 may identify whether the numbers of unicast DMRS ports of a plurality of terminals receiving the multicast signals are the same and, when the numbers of unicast DMRS ports of the plurality of terminals are the same on the basis of the identification result, map the multicast signal and the unicast signal to the remaining resources other than the unicast DMRS mapping resources and the multicast DMRS mapping resources through rate matching.

The base station processor 1601 may identify whether the numbers of unicast DMRS ports of a plurality of terminals receiving the multicast signals are the same and, when the numbers of unicast DMRS ports of the plurality of terminals are not the same on the basis of the identification result, puncture the unicast DMRS mapping resources, and map the multicast signal to the remaining resources other than locations of the multicast DMRS mapping resources through rate matching.

The base station processor 1601 may map the unicast signal to resources other than the unicast DMRS mapping resources and the multicast DMRS mapping resources and control the transceiver to transmit the unicast signal through resources that overlap the resources through which the multicast signal is transmitted.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary.

The invention claimed is:

1. A method performed by a terminal in a wireless communication system, the method comprising:
    receiving, from a base station, set information including information on a location of at least one resource to which a demodulation reference signal (DMRS) of a unicast signal is to be mapped;
    receiving, from the base station, a multicast signal and the unicast signal;
    decoding the multicast signal based on the set information;
    decoding the unicast signal based on the decoded multicast signal; and
    transmitting, to the base station, channel state information (CSI) related to the unicast signal,
    wherein the CSI related to the unicast signal is generated based on a ratio of a unicast physical downlink shared channel (PDSCH) energy per resource element (EPRE)

to a multicast PDSCH EPRE, in case that the multicast signal and the unicast signal are transmitted on overlapped resources, and wherein information on the ratio of the unicast PDSCH EPRE to the multicast PDSCH EPRE is provided from the base station.

2. The method of claim 1, wherein the multicast signal is decoded based on assumption of a specific value of the locations of the at least one resource identified based on the set information, the multicast signal that is decoded on the at least one resource is cancelled, and the unicast signal is decoded.

3. The method of claim 1, further comprising:
receiving, from the base station, information on an antenna port mapping between antenna ports for the unicast signal and antenna ports for the multicast signal,
wherein the CSI related to the unicast signal is generated based on the antenna port mapping and the ratio of the unicast PDSCH EPRE to the multicast PDSCH EPRE.

4. The method of claim 3, wherein a number of antenna ports for the unicast signal and a number of antenna ports for the multicast signal are different.

5. A terminal in a wireless communication system, the terminal comprising:
a transceiver; and
at least one processor configured to:
receive, from a base station via the transceiver, set information including information on locations of at least one resource to which a demodulation reference signal (DMRS) of a unicast signal is to be mapped,
receive, from the base station via the transceiver, a multicast signal and the unicast signal,
decode the multicast signal based on the set information,
decode the unicast signal based on the decoded multicast signal, and
transmit, to the base station via the transceiver, channel state information (CSI) related to the unicast signal,
wherein the CSI related to the unicast signal is generated based on a ratio of a unicast physical downlink shared channel (PDSCH) energy per resource element (EPRE) to a multicast PDSCH EPRE, in case that the multicast signal and the unicast signal are transmitted on overlapped resources, and
wherein information on the ratio of the unicast PDSCH EPRE to the multicast PDSCH EPRE is provided from the base station.

6. The terminal of claim 5, wherein the multicast signal is decoded based on assumption of a specific value of the locations of the at least one resource identified based on the set information, the multicast signal that is decoded on the at least one resource is cancelled, and the unicast signal is decoded.

7. The terminal of claim 5, wherein the at least one processor is further configured to receive, from the base station via the transceiver, information on an antenna port mapping between antenna ports for the unicast signal and antenna ports for the multicast signal, and
wherein the CSI related to the unicast signal is generated based on the antenna port mapping and the ratio of the unicast PDSCH EPRE to the multicast PDSCH EPRE.

8. The terminal of claim 7, wherein a number of antenna ports for the unicast signal and a number of antenna ports for the multicast signal are different.

9. A method performed by a base station in a wireless communication system, the method comprising;
transmitting, to a terminal, set information including information on locations of at least one resource to which a demodulation reference signal (DMRS) of a unicast signal is to be mapped;
mapping a multicast signal and the unicast signal to resources; based on the set information;
transmitting, to the terminal, the mapped multicast signal and unicast signal; and
receiving, from the terminal, channel state information (CSI) related to the unicast signal,
wherein the CSI related to the unicast signal is generated based on a ratio of a unicast physical downlink shared channel (PDSCH) energy per resource element (EPRE) to a multicast PDSCH EPRE, in case that the multicast signal and the unicast signal are transmitted on overlapped resources, and
wherein information on the ratio of the unicast PDSCH EPRE to the multicast PDSCH EPRE is provided to the terminal.

10. The method of claim 9, wherein the multicast signal is mapped through a puncturing method based on the set information, and the unicast signal is mapped through a rate matching method based on the set information and information related to resources to which a DMRS of the multicast signal is to be mapped.

11. The method of claim 9, further comprising:
transmitting, to the terminal, information on an antenna port mapping between antenna ports for the unicast signal and antenna ports for the multicast signal,
wherein the CSI related to the unicast signal is generated based on the antenna port mapping and the ratio of the unicast PDSCH EPRE to the multicast PDSCH EPRE.

12. The method of claim 9, wherein a number of antenna ports for the unicast signal and a number of antenna ports for the multicast signal are different.

13. A base station in a wireless communication system, the base station comprising:
a transceiver; and
at least one processor configured to:
transmit, to a terminal via the transceiver, set information including information on locations of at least one resource to which a demodulation reference signal (DMRS) of a unicast signal is to be mapped to a terminal,
map a multicast signal and the unicast signal to resources based on the set information,
transmit, to the terminal via the transceiver, the mapped multicast signal and unicast signal, and
receive, from the terminal via the transceiver, channel state information (CSI) related to the unicast signal,
wherein the CSI related to the unicast signal is generated based on a ratio of a unicast physical downlink shared channel (PDSCH) energy per resource element (EPRE) to a multicast PDSCH EPRE, in case that the multicast signal and the unicast signal are transmitted on overlapped resources, and
wherein information on the ratio of the unicast PDSCH EPRE to the multicast PDSCH EPRE is provided to the terminal.

14. The base station of claim 13, wherein the multicast signal is mapped through a puncturing method based on the set information, and the unicast signal is mapped through a rate matching method based on the set information and information related to resources to which a DMRS of the multicast signal is to be mapped.

15. The base station of claim 14, wherein the at least one processor is further configured to transmit, to the terminal via the transceiver, information on an antenna port mapping between antenna ports for the unicast signal and antenna ports for the multicast signal, and wherein the CSI related to the unicast signal is generated based on the antenna port mapping and the ratio of the unicast PDSCH EPRE to the multicast PDSCH EPRE.

16. The base station of claim 14, wherein a number of antenna ports for the unicast signal and a number of antenna ports for the multicast signal are different.

* * * * *